US012256005B2

United States Patent
Li et al.

(10) Patent No.: US 12,256,005 B2
(45) Date of Patent: Mar. 18, 2025

(54) COMMUNICATION SYSTEM, METHOD, AND APPARATUS

(71) Applicant: HUAWEI TECHNOLOGIES CO., LTD., Guangdong (CN)

(72) Inventors: He Li, Shanghai (CN); Rong Wu, Shenzhen (CN); Yizhuang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 284 days.

(21) Appl. No.: 17/954,167

(22) Filed: Sep. 27, 2022

(65) Prior Publication Data

US 2023/0019089 A1    Jan. 19, 2023

Related U.S. Application Data

(63) Continuation of application No. PCT/CN2021/084120, filed on Mar. 30, 2021.

(30) Foreign Application Priority Data

Mar. 30, 2020    (CN) .......................... 202010239015.9

(51) Int. Cl.
  *H04L 9/32*    (2006.01)
  *H04L 9/08*    (2006.01)
(52) U.S. Cl.
  CPC ............ *H04L 9/321* (2013.01); *H04L 9/0819* (2013.01); *H04L 9/0894* (2013.01)
(58) Field of Classification Search
  CPC ...... H04L 9/321; H04L 9/0819; H04L 9/0894
  See application file for complete search history.

(56) References Cited

U.S. PATENT DOCUMENTS

| 2019/0223063 A1 | 7/2019 | Palanigounder et al. |
| 2019/0261453 A1 | 8/2019 | Jain et al. |

(Continued)

FOREIGN PATENT DOCUMENTS

| CN | 110167013 A | 8/2019 |
| CN | 110881020 A | 3/2020 |
| CN | 110881185 A | 3/2020 |

OTHER PUBLICATIONS

Office Action in Indian Appln. No. 202217058603, mailed on Dec. 12, 2023, 7 pages (with English translation).

(Continued)

*Primary Examiner* — Ryan J Jakovac
(74) *Attorney, Agent, or Firm* — Fish & Richardson P.C.

(57) ABSTRACT

This application provides a communication system, method, and apparatus. The system is applied to implement authentication and key management for applications (AKMA) service-based data transmission between a terminal device and an application function network element. The system includes an AKMA anchor function network element and a network exposure function network element. The network exposure function network element obtains first identification information from a unified data management network element, where the first identification information is used to determine an authentication server function network element corresponding to the terminal device, and sends the first identification information to the AKMA anchor function network element. The AKMA anchor function network element obtains, from the unified data management network element based on the first identification information, identification information of the authentication server function network element corresponding to the terminal device.

20 Claims, 11 Drawing Sheets

(56) References Cited

U.S. PATENT DOCUMENTS

2020/0053828 A1  2/2020  Bharatia et al.
2021/0168599 A1  6/2021  Ben Henda et al.
2023/0068196 A1* 3/2023  Sasi ..................... H04W 12/06

OTHER PUBLICATIONS

Ericsson, "pCR to TS 33.535: Update of the AKMA procedures," 3GPP SG-SA3 Meeting #98e,S3-200296, Mar. 2-6, 2020, 4 pages.
Samsung, "AKMA and Application Key Derivation," 3GPP TSG-SA3 Meeting #98e, S3-200171, E-meeting, Mar. 2-6, 2020, 5 pages.
3GPP TS 33.535 v0.3.0, "3rd Generation Partnership Project; Technical Specification Group Services and System Aspects; Authentication and key management for applications; based on 3GPP credential in 5G (AKMA) (Release 16)", Mar. 2020, 12 pages.
3GPP TR 33.835, V0.6.0 22, "3rd Generation Partnership Project; Technical Specification Group Services and System Aspects; Study on authentication and key management for applications; based on 3GPP credential in 5G (Release 16)," Aug. 2019, 92 pages.
Extended European Search Report in European Appln No. 21781915.0, dated Jun. 26, 2023, 9 pages.
Ericsson, "PCR to TS 33.535: UE Authentication Result Notification," 3GPP TSG-SA3 Meeting #98e, S3-200297, e-meeting, Mar. 2-6, 2020, 2 pages.
Samsung, "AKMA and Application Key Derivation," 3GPP TSG-SA3 Meeting #98e, S3-200171, e-meeting, Mar. 2-6, 2020, 6 pages.
Office Action in Chinese Appln. No. 202010239015.9, dated Jun. 21, 2022, 16 pages (with English translation).
International Search Report and Written Opinion in International Appln. No. PCT/CN2021/084120, mailed on Jun. 25, 2021, 15 pages (with English translation).

* cited by examiner

COMMUNICATION SYSTEM, METHOD, AND APPARATUS

CROSS-REFERENCE TO RELATED APPLICATIONS

This application is a continuation of International Application No. PCT/CN2021/084120, filed on Mar. 30, 2021, which claims priority to Chinese Patent Application No. 202010239015.9, filed on Mar. 30, 2020. The disclosures of the aforementioned applications are hereby incorporated by reference in their entireties.

TECHNICAL FIELD

This application relates to the field of communication technologies, and in particular, to a communication system, method and apparatus.

BACKGROUND

In a process in which a terminal device registers with a core network, when receiving a registration request from the terminal device, an access network device selects a mobility management network element, and forwards the registration request to the mobility management network element, where the registration request may carry identity information of the terminal device. When receiving the registration request from the access network device, the mobility management network element may select an authentication server function network element based on the identity information of the terminal device that is carried in the registration request. The authentication server function network element may determine, based on the identity information of the terminal device, a unified data management network element serving the terminal device.

Currently, the terminal device may support an authentication and key management for applications (authentication and key management for applications, AKMA) service. In the AKMA service, the terminal device may perform data transmission with an application function network element not through the mobility management network element. In this way, the application function network element needs to learn of a communication key between the application function network element and the terminal device. The application function network element obtains the communication key between the application function network element and the terminal device from an AKMA anchor function network element, and the AKMA anchor function network element generates the communication key between the application function network element and the terminal device based on a key of the AKMA service of the terminal device and an identifier of the application function network element. The AKMA anchor function network element obtains the key of the AKMA service of the terminal device from the authentication server function network element corresponding to the terminal device, and the authentication server function network element corresponding to the terminal device stores an intermediate key generated in a primary authentication process. The authentication server function network element corresponding to the terminal device generates the key of the AKMA service of the terminal device based on the intermediate key.

There are a plurality of authentication server function network elements in a network. How the AKMA anchor function network element determines the authentication server function network element corresponding to the terminal device is an urgent technical problem to be resolved.

SUMMARY

This application provides a communication system, method and apparatus, so that an AKMA anchor function network element can quickly and accurately determine an authentication server function network element corresponding to a terminal device.

A first aspect of this application provides a communication system, where the system is configured to implement AKMA service-based data transmission between a terminal device and an application function network element, and the system includes an AKMA anchor function network element and a network exposure function network element, where the network exposure function network element is configured to: obtain first identification information from a unified data management network element, where the first identification information is used to determine an authentication server function network element corresponding to the terminal device, and send the first identification information to the AKMA anchor function network element; and the AKMA anchor function network element is configured to obtain, from the unified data management network element based on the first identification information, identification information of the authentication server function network element corresponding to the terminal device.

The authentication server function network element corresponding to the terminal device is an authentication server function network element corresponding to an intermediate key of the terminal device, and stores the intermediate key generated by the authentication server function network element in a primary authentication process. The intermediate key is, for example, Kausf.

According to the first aspect of this application, for the application function network element located outside a core network, the network exposure function network element obtains the first identification information from the unified data management network element, and sends the first identification information to the AKMA anchor function network element; and the AKMA anchor function network element obtains, from the unified data management network element based on the first identification information, the identification information of the authentication server function network element corresponding to the terminal device, so that the AKMA anchor function network element can quickly and accurately determine the authentication server function network element corresponding to the terminal device.

In a possible implementation, that the first identification information is used to determine the authentication server function network element corresponding to the terminal device may be that the network exposure function network element determines the authentication server function network element corresponding to the terminal device in a direct determining manner or in an auxiliary determining manner, or may be that the AKMA anchor function network element determines the authentication server function network element corresponding to the terminal device in a direct determining manner or in an auxiliary determining manner. The direct determining manner means that additional information does not need to be obtained, and the determining is enabled directly based on the first identification information. This manner is easy to implement. The auxiliary determining manner means that additional information needs to be obtained, and the determining is performed with reference to the first identification information.

In a possible implementation, the network exposure function network element is specifically configured to: receive second identification information from the application function network element; send a first request message to the unified data management network element when determining that the application function network element authorizes the network exposure function network element to request a key, where the first request message includes the second identification information, and requests the unified data management network element to determine the first identification information based on the second identification information; and receive a first response message from the unified data management network element, where the first response message includes the first identification information. Therefore, the network exposure function network element obtains the first identification information from the unified data management network element, so that a core network element obtains, from the unified data management network element based on the first identification information, the identification information of the authentication server function network element corresponding to the terminal device.

In a possible implementation, the second identification information includes identification information of a key of the AKMA service, the identification information of the key of the AKMA service is unique, and the first identification information includes a subscriber permanent identifier SUPI of the terminal device.

In a possible implementation, the second identification information includes identification information of a key of the AKMA service and temporary identity information of the terminal device, the identification information of the key of the AKMA service is not unique, and the first identification information includes an SUPI of the terminal device.

In an implementation, the unified data management network element may determine intermediate information based on the identification information of the key of the AKMA service. The intermediate information may be, for example, the SUPI of the terminal device. To be specific, the unified data management network element determines the first identification information based on the second identification information, and sends the SUPI of the terminal device to the network exposure function network element, and the network exposure function network element may send the SUPI of the terminal device to the AKMA anchor function network element. The AKMA anchor function network element may obtain, from the unified data management network element by using the SUPI of the terminal device, the identification information of the authentication server function network element corresponding to the terminal device. This manner may be understood as the auxiliary determining manner.

In an implementation, the unified data management network element may directly determine, based on the identification information of the key of the AKMA service, subscription data of the AKMA service and/or the identification information of the authentication server function network element corresponding to the terminal device. Further, the AKMA anchor function network element may obtain, from the unified data management network element, the identification information of the authentication server function network element corresponding to the terminal device. If only the subscription data of the AKMA service is determined, the subscription data of the AKMA service may include the identification information of the authentication server function network element corresponding to the terminal device. This manner may be understood as the direct determining manner.

The key of the AKMA service may be Kakma, and the temporary identity information of the terminal device may be a subscription concealed identifier (subscriber concealed identifier, SUCI), a generic public subscription identifier (generic public subscription identifier, GPSI), or the like.

In a possible implementation, the AKMA anchor function network element is specifically configured to: send a second request message to the unified data management network element, where the second request message includes the SUPI of the terminal device, and the second request requests the unified data management network element to determine, based on the SUPI of the terminal device, the identification information of the authentication server function network element corresponding to the terminal device; and receive a second response message from the unified data management network element, where the second response message includes the identification information of the authentication server function network element corresponding to the terminal device. Therefore, the AKMA anchor function network element obtains, from the unified data management network element, the identification information of the authentication server function network element corresponding to the terminal device, and then can quickly and accurately determine the authentication server function network element corresponding to the terminal device.

In a possible implementation, the network exposure function network element is further configured to: receive an identifier of the application function network element; and send the identifier of the application function network element to the AKMA anchor function network element.

The AKMA anchor function network element is further configured to: obtain, from the authentication server function network element corresponding to the terminal device, the key that is of the AKMA service and that is identified by identification information of the key of the AKMA service; generate a communication key between the application function network element and the terminal device based on the identifier of the application function network element and the key of the AKMA service; and send the communication key to the application function network element by using the network exposure function network element. Therefore, the application function network element may encrypt, by using the communication key, data to be sent to the terminal device, and this helps improve data transmission security.

In a possible implementation, the AKMA anchor function network element is further configured to: perform authorization detection on the terminal device or the application function network element, and when completing the authorization detection, determine the authentication server function network element corresponding to the terminal device. Optionally, the AKMA anchor function network element is further configured to: perform authorization detection on the terminal device or the application function network element, and when completing the authorization detection, generate the communication key between the application function network element and the terminal device. The authorization detection can improve network security.

A second aspect of this application provides a communication method, where the method is used to implement AKMA service-based data transmission between a terminal device and an application function network element, the method may be performed by an AKMA anchor function network element, or may be performed by a component (for example, a processor, a chip, or a chip system) of the AKMA anchor function network element, and the method may include:

The AKMA anchor function network element receives first identification information from a network exposure function network element, where the first identification information is used to determine an authentication server function network element corresponding to the terminal device; and obtains, from a unified data management network element based on the first identification information, identification information of the authentication server function network element corresponding to the terminal device.

The authentication server function network element corresponding to the terminal device is an authentication server function network element corresponding to an intermediate key of the terminal device, and stores the intermediate key generated by the authentication server function network element in a primary authentication process. The intermediate key is, for example, Kausf.

According to the second aspect of this application, the AKMA anchor function network element obtains, from the unified data management network element based on the first identification information, the identification information of the authentication server function network element corresponding to the terminal device, so that the AKMA anchor function network element can quickly and accurately determine the authentication server function network element corresponding to the terminal device.

In a possible implementation, the first identification information includes an SUPI of the terminal device.

The AKMA anchor function network element sends a second request message to the unified data management network element, where the second request message includes the SUPI of the terminal device, and the second request requests the unified data management network element to determine, based on the SUPI of the terminal device, the identification information of the authentication server function network element corresponding to the terminal device; and receives a second response message from the unified data management network element, where the second response message includes the identification information of the authentication server function network element corresponding to the terminal device. Therefore, the AKMA anchor function network element obtains, from the unified data management network element, the identification information of the authentication server function network element corresponding to the terminal device, and then can quickly and accurately determine the authentication server function network element corresponding to the terminal device.

In a possible implementation, the second response message further includes subscription data of the AKMA service of the terminal device. The AKMA anchor function network element may perform authorization detection on the terminal device or the application function network element based on the subscription data of the AKMA service of the terminal device, so that network security can be improved.

In a possible implementation, the AKMA anchor function network element receives an identifier of the application function network element from the network exposure function network element; obtains, from the authentication server function network element corresponding to the terminal device, the key that is of the AKMA service and that is identified by identification information of the key of the AKMA service; generates a communication key between the application function network element and the terminal device based on the identifier of the application function network element and the key of the AKMA service; and sends the communication key to the application function network element by using the network exposure function network element. Therefore, the application function network element may encrypt, by using the communication key, data to be sent to the terminal device, and this helps improve data transmission security.

In a possible implementation, the AKMA anchor function network element performs authorization detection on the terminal device or the application function network element, and when completing the authorization detection, determines the authentication server function network element corresponding to the terminal device. Optionally, the AKMA anchor function network element is further configured to: perform authorization detection on the terminal device or the application function network element, and when completing the authorization detection, generate the communication key between the application function network element and the terminal device. The authorization detection can improve network security.

A third aspect of this application provides a communication method, where the method is used to implement AKMA service-based data transmission between a terminal device and an application function network element, the method may be performed by a network exposure function network element, or may be performed by a component (for example, a processor, a chip, or a chip system) of the network exposure function network element, and the method may include:

The network exposure function network element obtains first identification information from a unified data management network element, where the first identification information is used to determine an authentication server function network element corresponding to the terminal device, and sends the first identification information to an AKMA anchor function network element.

The authentication server function network element corresponding to the terminal device is an authentication server function network element corresponding to an intermediate key of the terminal device, and stores the intermediate key generated by the authentication server function network element in a primary authentication process. The intermediate key is, for example, Kausf.

According to the third aspect of this application, the network exposure function network element obtains the first identification information, and sends the first identification information to the AKMA anchor function network element; so that the AKMA anchor function network element obtains, from the unified data management network element based on the first identification information, the identification information of the authentication server function network element corresponding to the terminal device, so that the AKMA anchor function network element can quickly and accurately determine the authentication server function network element corresponding to the terminal device.

In a possible implementation, the network exposure function network element receives second identification information from the application function network element; sends a first request message to the unified data management network element when determining that the application function network element authorizes the network exposure function network element to request a key, where the first request message includes the second identification information, and requests the unified data management network element to determine the first identification information based on the second identification information; and receives a first response message from the unified data management network element, where the first response message includes the first identification information. Therefore, the network exposure function network element obtains the first identification information from the unified data management network element, so that a core network element obtains, from the unified data management network element based on the first identification information, the authentication server function network element corresponding to the terminal device.

In a possible implementation, the second identification information includes identification information of a key of the AKMA service, the identification information of the key of the AKMA service is unique, and the first identification information includes an SUPI of the terminal device.

In a possible implementation, the second identification information includes identification information of a key of the AKMA service and temporary identity information of the terminal device, the identification information of the key of the AKMA service is not unique, and the first identification information includes an SUPI of the terminal device.

In a possible implementation, the network exposure function network element receives the identifier of the application function network element, and sends the identifier of the application function network element to the AKMA anchor function network element, so that when the AKMA anchor function network element obtains the key of the AKMA service from the authentication server function network element corresponding to the terminal device, generates a communication key between the application function network element and the terminal device.

A fourth aspect of this application provides a communication system, where the system is configured to implement AKMA service-based data transmission between a terminal device and an application function network element, and the system includes an AKMA anchor function network element and a network exposure function network element.

The network exposure function network element is configured to: obtain first identification information from a unified data management network element, where the first identification information is used to determine an authentication server function network element corresponding to the terminal device; obtain, from the unified data management network element based on the first identification information, identification information of the authentication server function network element corresponding to the terminal device; and send the first identification information of the authentication server function network element corresponding to the terminal device to the AKMA anchor function network element.

The AKMA anchor function network element is configured to receive the identification information of the authentication server function network element corresponding to the terminal device from the network exposure function network element.

The authentication server function network element corresponding to the terminal device is an authentication server function network element corresponding to an intermediate key of the terminal device, and stores the intermediate key generated by the authentication server function network element in a primary authentication process. The intermediate key is, for example, Kausf.

According to the fourth aspect of this application, for an application function network element located outside a core network, the network exposure function network element obtains the identification information of the authentication server function network element corresponding to the terminal device from the unified data management network element and sends the identification information of the authentication server function network element corresponding to the terminal device to the AKMA anchor function network element, so that the AKMA anchor function network element can quickly and accurately determine the authentication server function network element corresponding to the terminal device.

In a possible implementation, the network exposure function network element is configured to: receive second identification information from the application function network element; send a first request message to the unified data management network element when determining that the application function network element authorizes the network exposure function network element to request a key, where the first request message includes the second identification information, and requests the unified data management network element to determine the first identification information based on the second identification information; and receive a first response message from the unified data management network element, where the first response message includes the first identification information. Therefore, the network exposure function network element obtains the first identification information from the unified data management network element, to obtain, from the unified data management network element based on the first identification information, the identification information of the authentication server function network element corresponding to the terminal device.

In a possible implementation, the network exposure function network element is configured to: send a first request message to the unified data management network element, where the first request message includes the second identification information, and requests the unified data management network element to determine, based on the second identification information, the identification information of the authentication server function network element corresponding to the terminal device; and receive a first response message from the unified data management network element, where the first response message includes the identification information of the authentication server function network element corresponding to the terminal device. Therefore, the network exposure function network element directly obtains, from the unified data management network element, the identification information of the authentication server function network element corresponding to the terminal device.

In a possible implementation, the second identification information includes identification information of a key of the AKMA service, the identification information of the key of the AKMA service is unique, and the first identification information includes an SUPI of the terminal device.

In a possible implementation, the second identification information includes identification information of a key of the AKMA service and temporary identity information of the terminal device, the identification information of the key of the AKMA service is not unique, and the first identification information includes an SUPI of the terminal device.

A fifth aspect of this application provides a communication method, where the method is used to implement AKMA service-based data transmission between a terminal device and an application function network element, the method may be performed by an AKMA anchor function network element, or may be performed by a component (for example, a processor, a chip, or a chip system) of the AKMA anchor function network element, and the method may include:

The AKMA anchor function network element is configured to receive identification information of an authentication server function network element corresponding to the terminal device from a network exposure function network element; and determine, based on the identification information of the authentication server function network element corresponding to the terminal device, the authentication server function network element corresponding to the terminal device.

According to the fifth aspect of this application, the AKMA anchor function network element directly obtains, from the network exposure function network element, the identification information of the authentication server function network element corresponding to the terminal device, so that the AKMA anchor function network element can quickly and accurately determine the authentication server function network element corresponding to the terminal device.

A sixth aspect of this application provides a communication method, where the method is used to implement AKMA service-based data transmission between a terminal device and an application function network element, the method may be performed by a network exposure function network element, or may be performed by a component (for example, a processor, a chip, or a chip system) of the network exposure function network element, and the method may include:

The network exposure function network element is configured to obtain, from the unified data management network element, identification information of an authentication server function network element corresponding to the terminal device; and send the identification information of the authentication server function network element corresponding to the terminal device to an AKMA anchor function network element.

According to the sixth aspect of this application, the network exposure function network element obtains, from the unified data management network element, the identification information of the authentication server function network element corresponding to the terminal device, and notifies the AKMA anchor function network element, so that the AKMA anchor function network element can quickly and accurately determine the authentication server function network element corresponding to the terminal device.

In a possible implementation, the network exposure function network element obtains first identification information from a unified data management network element, where the first identification information is used to determine an authentication server function network element corresponding to the terminal device; obtains, from the unified data management network element based on the first identification information, identification information of the authentication server function network element corresponding to the terminal device; and sends the identification information of the authentication server function network element corresponding to the terminal device to the AKMA anchor function network element.

In a possible implementation, the network exposure function network element is configured to: send a first request message to the unified data management network element, where the first request message includes second identification information, and requests the unified data management network element to determine, based on the second identification information, the identification information of the authentication server function network element corresponding to the terminal device; and receive a first response message from the unified data management network element, where the first response message includes the identification information of the authentication server function network element corresponding to the terminal device.

A seventh aspect of this application provides a communication system, where the system is configured to implement AKMA service-based data transmission between a terminal device and an application function network element, and the system includes an AKMA anchor function network element and a network exposure function network element.

The network exposure function network element is configured to receive a key request message from the application function network element, and send the key request message to the AKMA anchor function network element, where the key request message includes second identification information.

The AKMA anchor function network element is configured to obtain, from a unified data management network element based on the second identification information, identification information of an authentication server function network element corresponding to the terminal device.

The authentication server function network element corresponding to the terminal device is an authentication server function network element corresponding to an intermediate key of the terminal device, and stores the intermediate key generated by the authentication server function network element in a primary authentication process. The intermediate key is, for example, Kausf.

According to the seventh aspect of this application, for an application function network element located outside a core network, the network exposure function network element directly forwards, to the AKMA anchor function network element, the key request message sent by the application function network element; and the AKMA anchor function network element autonomously obtains, from the unified data management network element based on the second identification information, the identification information of the authentication server function network element corresponding to the terminal device, so that the AKMA anchor function network element can quickly and accurately determine the authentication server function network element corresponding to the terminal device.

In a possible implementation, the second identification information includes identification information of a key of the AKMA service, and the identification information of the key of the AKMA service is unique.

In a possible implementation, the second identification information includes identification information of a key of the AKMA service and temporary identity information of the terminal device, and the identification information of the key of the AKMA service is not unique.

An eighth aspect of an embodiment of this application provides a communication apparatus. The communication apparatus may be an AKMA anchor function network element, or may be a component of the AKMA anchor function network element, or an apparatus that can match and be used with the AKMA anchor function network element. In a design, the apparatus may include modules that are in correspondence with the methods/operations/steps/actions described in the second aspect or the fifth aspect. The modules may be implemented by using a hardware circuit, software, or a combination of the hardware circuit and the software. In a design, the apparatus may include a processing module and a transceiver module. For example, the processing module is configured to: receive, by using the transceiver module, first identification information from a network exposure function network element, where the first identification information is used to determine an authentication server function network element corresponding to a terminal device; and obtain, from a unified data management network element based on the first identification information, identification information of the authentication server function network element corresponding to the terminal device.

A ninth aspect of an embodiment of this application provides a communication apparatus. The apparatus includes a processor, configured to implement the method described in the second aspect. The apparatus may further include a memory, configured to store instructions and data. The memory is coupled to the processor. When the processor executes the instructions stored in the memory, the apparatus may be enabled to implement the method described in the second aspect or the method described in the fifth aspect. The apparatus may further include a communication interface. The communication interface is used by the apparatus to communicate with another device. For example, the communication interface may be a transceiver, a circuit, a bus, a module, or another type of communication interface. The another device may be a unified data management network element, a network exposure function network element or the like. In a possible design, the apparatus includes:

the memory, configured to store program instructions; and the processor is configured to control the communication interface to: receive first identification information from the network exposure function network element, where the first identification information is used to determine an authentication server function network element corresponding to a terminal device; and obtain, from the unified data management network element based on the first identification information, identification information of the authentication server function network element corresponding to the terminal device.

A tenth aspect of an embodiment of this application provides a computer-readable storage medium, including instructions. When the instructions are run on a computer, the computer is enabled to perform the method provided in the second aspect or the method in the fifth aspect.

An eleventh aspect of an embodiment of this application provides a chip system. The chip system includes a processor, and may further include a memory, configured to implement the method provided in the second aspect or the method in the fifth aspect. The chip system may include a chip, or may include a chip and another discrete component.

A twelfth aspect of an embodiment of this application provides a communication apparatus. The communication apparatus may be a network exposure function network element, or may be a component of the network exposure function network element, or an apparatus that can match and be used with the network exposure function network element. In a design, the apparatus may include modules that are in correspondence with the methods/operations/steps/actions described in the third aspect or the sixth aspect. The modules may be implemented by using a hardware circuit, software, or a combination of the hardware circuit and the software. In a design, the apparatus may include a processing module and a transceiver module. For example, the processing module is configured to: obtain, by using the transceiver module, first identification information from a unified data management network element, where the first identification information is used to determine an authentication server function network element corresponding to a terminal device, and send the first identification information to an AKMA anchor function network element.

A thirteenth aspect of an embodiment of this application provides a communication apparatus. The apparatus includes a processor, configured to implement the method described in the third aspect. The apparatus may further include a memory, configured to store instructions and data. The memory is coupled to the processor. When the processor executes the instructions stored in the memory, the apparatus may be enabled to implement the method described in the third aspect or the method described in the sixth aspect. The apparatus may further include a communication interface. The communication interface is used by the apparatus to communicate with another device. For example, the communication interface may be a transceiver, a circuit, a bus, a module, or another type of communication interface. The another device may be a unified data management network element, a network exposure function network element or the like. In a possible design, the apparatus includes:

the memory, configured to store program instructions; and the processor is configured to control the communication interface to: obtain first identification information from the unified data management network element, where the first identification information is used to determine an authentication server function network element corresponding to a terminal device, and send the first identification information to an AKMA anchor function network element.

A fourteenth aspect of an embodiment of this application provides a computer-readable storage medium, including instructions. When the instructions are run on a computer, the computer is enabled to perform the method provided in the third aspect or in the sixth aspect.

A fifteenth aspect of an embodiment of this application provides a chip system. The chip system includes a processor, and may further include a memory, configured to implement the method provided in the third aspect or in the sixth aspect. The chip system may include a chip, or may include a chip and another discrete component.

DESCRIPTION OF EMBODIMENTS

To better understand the technical solutions provided in this application, technical terms in this application are first described.

(1) Fifth-Generation (5Th-Generation, 5G) System

The 5G system may include a terminal device, an access network, and a core network. For example, refer to a schematic diagram of a network architecture of a 5G system shown in FIG. 1.

Figure 1:
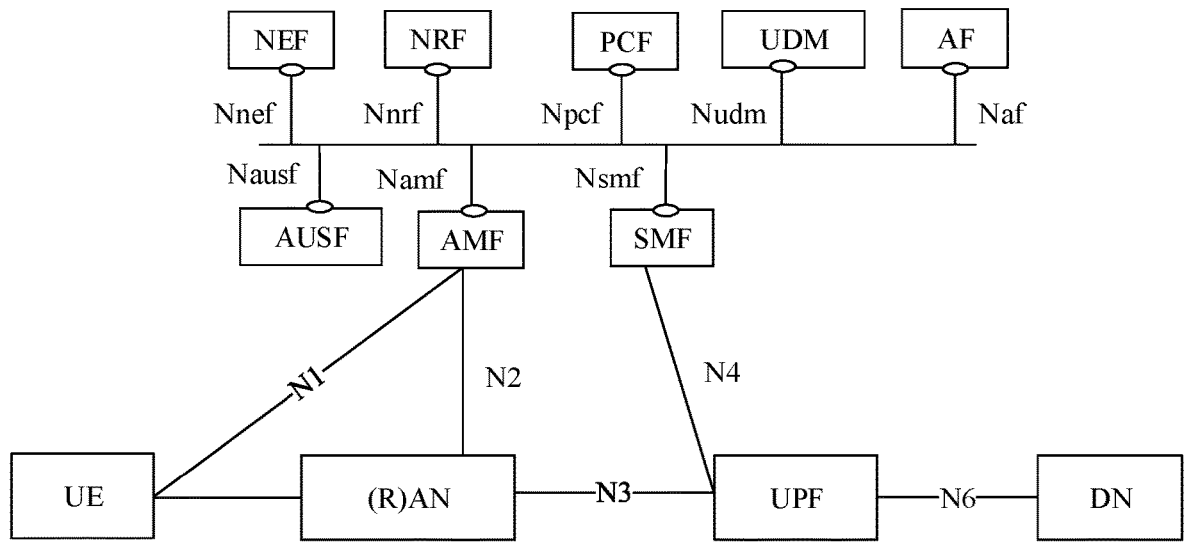
FIG. 1 is a schematic diagram of a network architecture of a 5G communication system.

The terminal device is a device that has a wireless transceiver function, and may be deployed on the land, including an indoor or outdoor device, a hand-held device, a wearable device, or a vehicle-mounted device, or may be deployed on the water (for example, on a ship), or may be deployed in the air (for example, on a plane, a balloon, or a satellite). The terminal device may be a mobile phone (mobile phone), a tablet computer (pad), a computer having a wireless transceiver function, a virtual reality (virtual reality, VR) terminal device, an augmented reality (augmented reality, AR) terminal device, a wireless terminal in industrial control (industrial control), a vehicle-mounted terminal device, a wireless terminal in self-driving (self-driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a wearable terminal device, or the like. The terminal device sometimes may also be referred to as a terminal, user equipment (user equipment, UE), an access terminal device, a vehicle-mounted terminal, an industrial control terminal, a UE unit, a UE station, a mobile station, a mobile console, a remote station, a remote terminal device, a mobile device, a UE agent, a UE apparatus, or the like. The terminal device may alternatively be fixed or mobile. In FIG. 1 and this application, an example in which the terminal device is UE is used for description.

An access network is configured to implement an access-related function, and may provide a network access function for an authorized user in a specific area. The access network forwards a control signal and user data between the terminal device and a core network. The access network may include an access network device. The access network device may be a device that provides access for the terminal device, and may include a radio access network (radio access network, RAN) device and an device. The RAN device is mainly a wireless network device in a 3GPP network, and the AN device may be an access network device defined in non-3GPP. In a system using different radio access technologies, a device having a base station function may have different names. For example, in a 5G system, the device is referred to as a RAN or a next generation base station (next-generation Node basestation, gNB). In a long term evolution (long term evolution, LTE) system, the device is referred to as an evolved NodeB (evolved NodeB, eNB or eNodeB).

The core network is responsible for maintaining subscription data of a mobile network, and providing functions such as session management, mobility management, policy management, and security authentication for the UE. The core network may include the following network elements: a user plane function (user plane function, UPF) network element, an authentication service function (authentication server function, AUSF) network element, an access and mobility management function (access and mobility management function, AMF) network element, a session management function (session management function, SMF) network element, a network exposure function (network exposure function, NEF) network element, a network repository function (network function repository function, NRF) network element, a policy control function (policy control function, PCF) network element, a unified data management (unified data management, UDM) network element, and an application function (application function, AF) network element.

The AMF is mainly responsible for mobility management in the mobile network, such as user location update, registration of a user with a network, and user switching. The SMF is mainly responsible for session management in the mobile network, such as session establishment, modification, and release. The UPF is responsible for forwarding and receiving user data in the terminal device, may receive the user data from a data network, and transmit the user data to the terminal device by using the access network device; or may receive the user data from the terminal device by using the access network device, and forward the user data to the data network. The PCF mainly supports providing a unified policy framework to control network behavior, and providing a policy rule for a control layer network function, and is responsible for obtaining policy-decision-related subscription information of a user. The AUSF is configured to perform UE security authentication. The NEF is mainly configured to support capability and event exposure. The NRF is configured for storing and selecting network function entity information for another network element. The UDM is configured to store user data, for example, subscription data and authentication/authorization data. The AF interacts with a 3GPP core network to provide an application layer service, for example, provide application layer data routing, provide an access network capability exposure function, interact with a policy framework to provide policy control, and interact with an IP multimedia subsystem (IP multimedia subsystem, IMS) in a 5G network.

The data network (data network, DN) is configured to provide services for users. The data network may be a private network, for example, a local area network. The data network may alternatively be an external network that is not controlled by operators, for example, the Internet (Internet). The data network may alternatively be a dedicated network jointly deployed by operators, for example, a network in the IMS. The terminal device may access the DN by using an established protocol data unit (protocol data unit, PDU) session.

(2) AKMA Service

When UE that supports the AKMA service performs data transmission with an AF that supports the AKMA service, security protection based on an AKMA procedure can be performed to improve data transmission security. For example, the AF corresponds to a video application program. When the UE that supports the AKMA service performs data transmission with the AF, in comparison with a conventional unprotected transmission method between the UE and the AF, using the AKMA service can improve data transmission security. For example, refer to a schematic diagram of a network architecture of an AKMA service shown in FIG. 2. The network architecture shown in FIG. 2 includes UE, a (R)AN, an AUSF, an AMF, an AF, an NEF, an AKMA anchor function network element (AKMA anchor function, AAnF), and a UDM.

Figure 2:
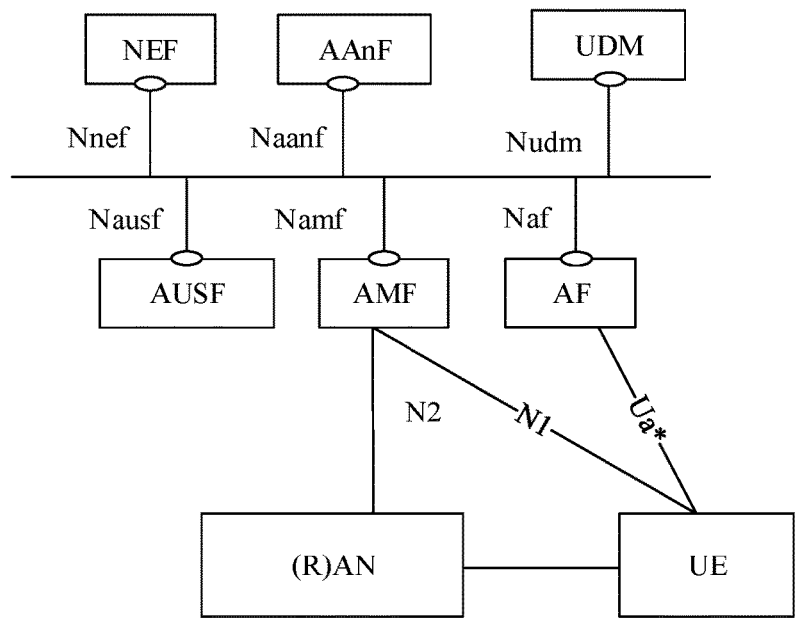
FIG. 2 is a schematic diagram of a network architecture of an AKMA service.

In FIG. 2, there are three manners in which the UE communicates with the AF. One manner is that the UE communicates with the AF by using the (R)AN and the AMF, one manner is that the UE communicates with the AF by using the AMF, and one manner is that the UE directly communicates with the AF through a Ua* interface. The Ua* interface is a communication interface between the UE and the AF.

In FIG. 2, in the AKMA service, the AUSF may generate a key of the AKMA service, and provide the key of the AKMA service of the UE to the AAnF. The key of the AKMA service may be Kakma, or may be referred to as a root key of the AKMA service. A UE side also generates a same key of the AKMA service, that is, same Kakma.

Figure 3:
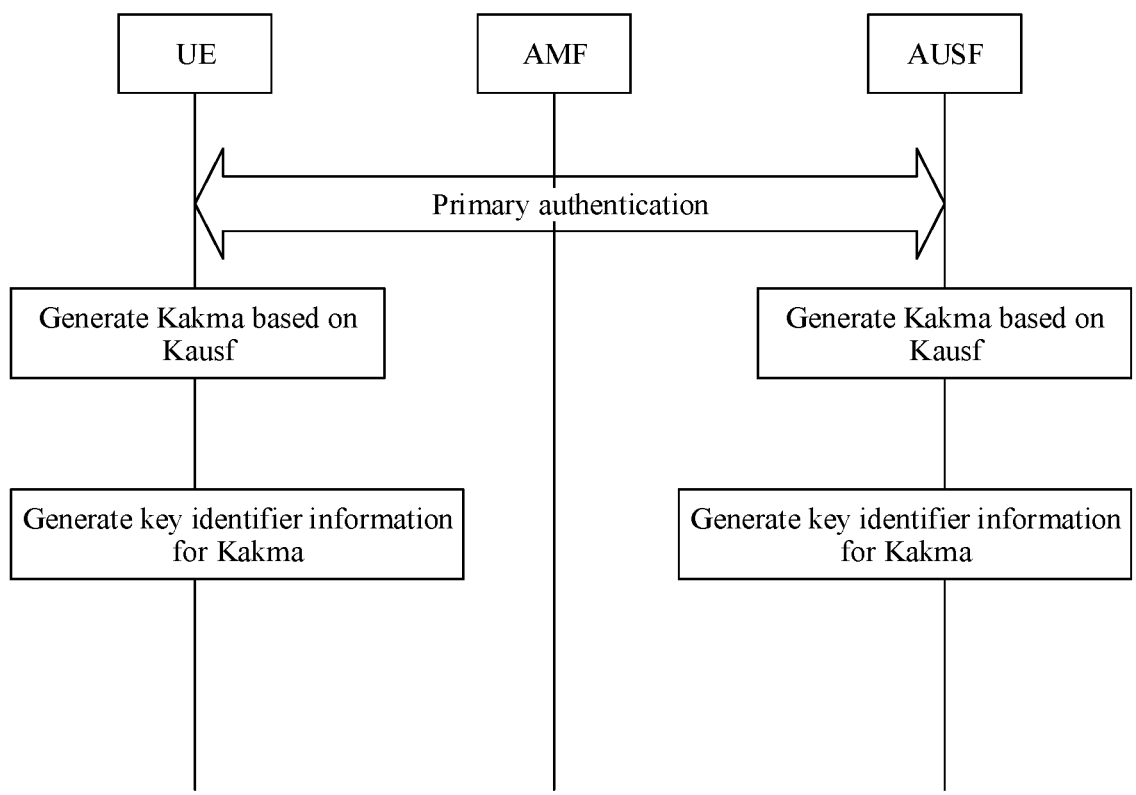
FIG. 3 is a schematic flowchart of generating a key of an AKMA service.

For example, for a process of generating the key of the AKMA service, refer to FIG. 3. When UE registers with a 5G core network, the UE sends a registration request to an AMF through a RAN. The registration request carries identity information of the UE. The AMF selects an AUSF based on the identity information of the UE (for example, a subscription concealed identifier (subscriber concealed identifier, SUCI)), and sends a message to the AUSF to trigger a primary authentication procedure. The AUSF authenticates the UE and sends an authentication parameter to the AMF. The AMF sends the authentication parameter to the UE through the RAN. The UE authenticates the AUSF based on the authentication parameter and sends a response to the AMF through the RAN. The AMF compares the response. If the response meets a requirement, the authentication succeeds. Primary authentication (primary authentication) in FIG. 3 is a process in which the AUSF authenticates the UE and the UE authenticates the AUSF in a registration process. The primary authentication may also be described as bidirectional authentication. In FIG. 3, after the primary authentication, the AUSF may generate Kakma by using an intermediate key generated in a primary authentication process, for example, Kausf, and generate key identifier information for Kakma. The key identifier information may be used to identify Kakma, for example, may be a Kakma identifier (identifier, ID). After the primary authentication and before initiating an AKMA service, the UE generates Kakma by using an intermediate key generated in a primary authentication process, for example, Kausf, and generates key identifier information for Kakma.

In FIG. 2, the AAnF may interact with the AUSF, obtain the key of the AKMA service from the AUSF, and generate a communication key between the AF and the UE and a validity period of the communication key based on the key of the AKMA service and an identifier of the AF. The AAnF may send the communication key and the validity period of the communication key to the AF, so that the AF can perform data transmission with the UE by using the communication key, and this improves data transmission security between the AF and the UE. The communication key between the AF and the UE may be, for example, Kaf.

Figure 4:
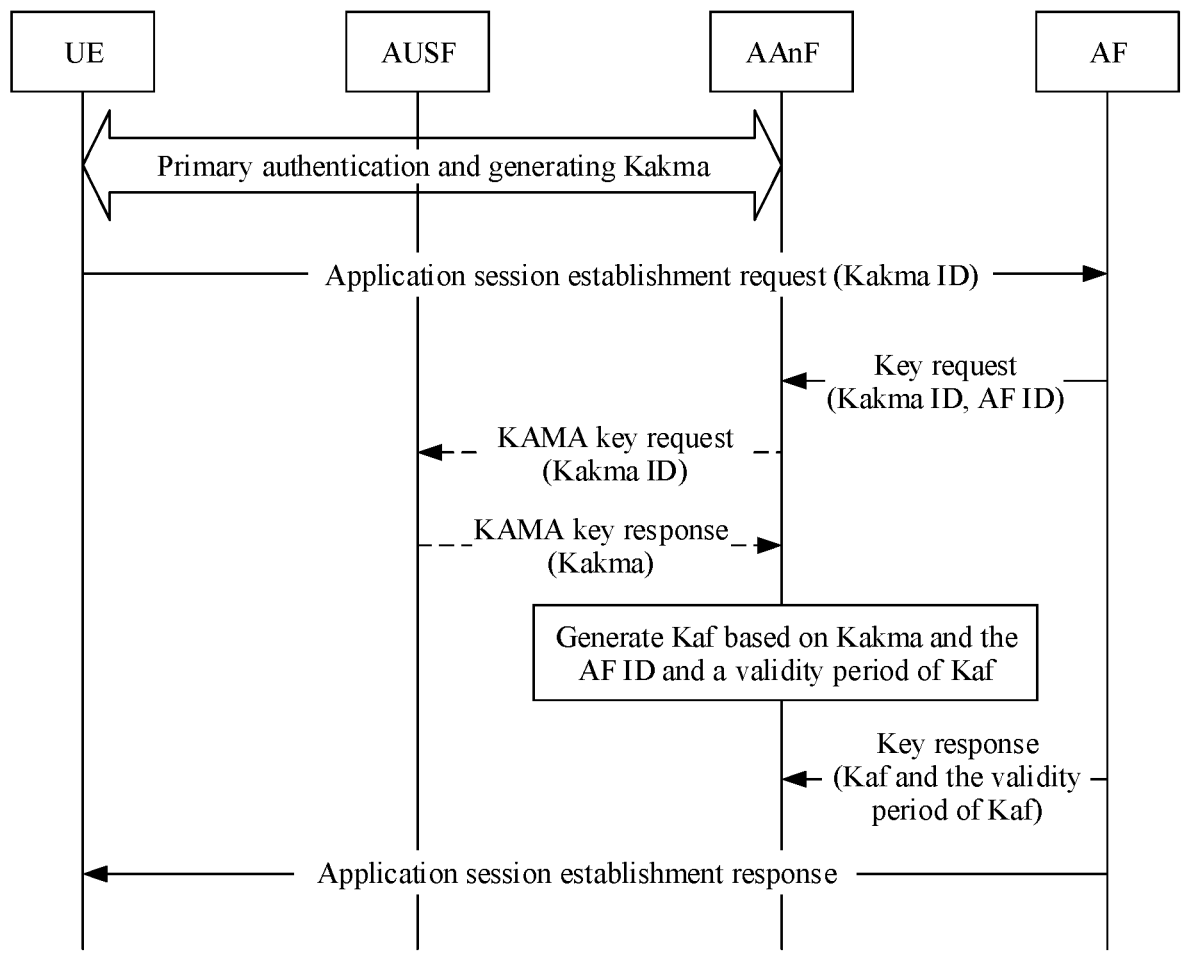
FIG. 4 is a schematic flowchart of generating a communication key between an AF and UE.

For example, for a process of generating the communication key between the AF and the UE, refer to FIG. 4. In FIG. 4, before sending an application session establishment request to the AF, the UE performs a process of primary authentication and Kakma generation. After Kakma and the Kakma ID are generated, the AAnF may store Kakma corresponding to the Kakma ID. The UE sends, to the AF, an application session establishment request (for example, an application session establishment request) that carries the Kakma ID. When receiving the application session establishment request, the AF sends a key request (for example, a key request) to the AAnF, where the key request requests Kaf between the AF and the UE, and the key request carries the Kakma ID and an AF ID. If the AAnF stores Kakma corresponding to the Kakma ID, the AAnF directly generates Kaf and a validity period of Kaf based on Kakma and the AF ID. If the AAnF does not store Kakma corresponding to the Kakma ID, the AAnF sends an AKMA key request (for example, an AKMA key request) carrying the Kakma ID to the AUSF. The AUSF searches for corresponding Kakma based on the Kakma ID, and sends an AKMA key response carrying Kakma to the AAnF. The AAnF generates Kaf and the validity period of Kaf based on Kakma and the AF ID. The AAnF sends a key response (for example, a key response) to the AF, where the key response carries Kaf and the validity period of Kaf. After receiving the key response, the AF sends an application session establishment response (for example, an application session establishment response) to the UE.

Kaf between different AFs and same UE may be different. For example, Kaf between an AF 1 and UE 1 is Kaf 1, and Kaf between an AF 2 and the UE 1 is Kaf 2. In FIG. 2, the AF may interact with a 3GPP core network element. For example, the AF may obtain a quality of service (quality of service, QoS) parameter from a PCF, or the AF provides a QoS parameter for a PCF, and then data transmission of an application program may be affected. For another example, the AF may interact with an NEF. In an AKMA service scenario, the AF obtains, from the AAnF, the communication key between the AF and the UE and the validity period of the communication key. The AF may be located inside or outside the 5G core network. If the AF is located inside the 5G core network, the AF may directly interact with the PCF. If the AF is located outside the 5G core network, the AF may interact with the PCF by using the NEF.

In FIG. 2, the NEF may be used as an intermediate medium to provide an interaction service between an AF located outside the 5G core network and an AAnF in the 5G core network, and may further provide an interaction service between an AF located outside the 5G core network and a PCF in the 5G core network.

The 5G system includes one AUSF. When the AUSF stores Kausf, the AUSF may generate Kakma based on Kausf, and the AAnF may obtain Kakma from the AUSF, to generate Kaf between the AF and the UE. However, in actual application, the 5G system may include a plurality of AUSFs, and how the AAnF determines an AUSF that stores Kausf is an urgent technical problem to be resolved.

In view of this, this application provides a communication system, method and apparatus, so that the AAnF can quickly and accurately determine the AUSF that stores Kausf.

Figure 5:
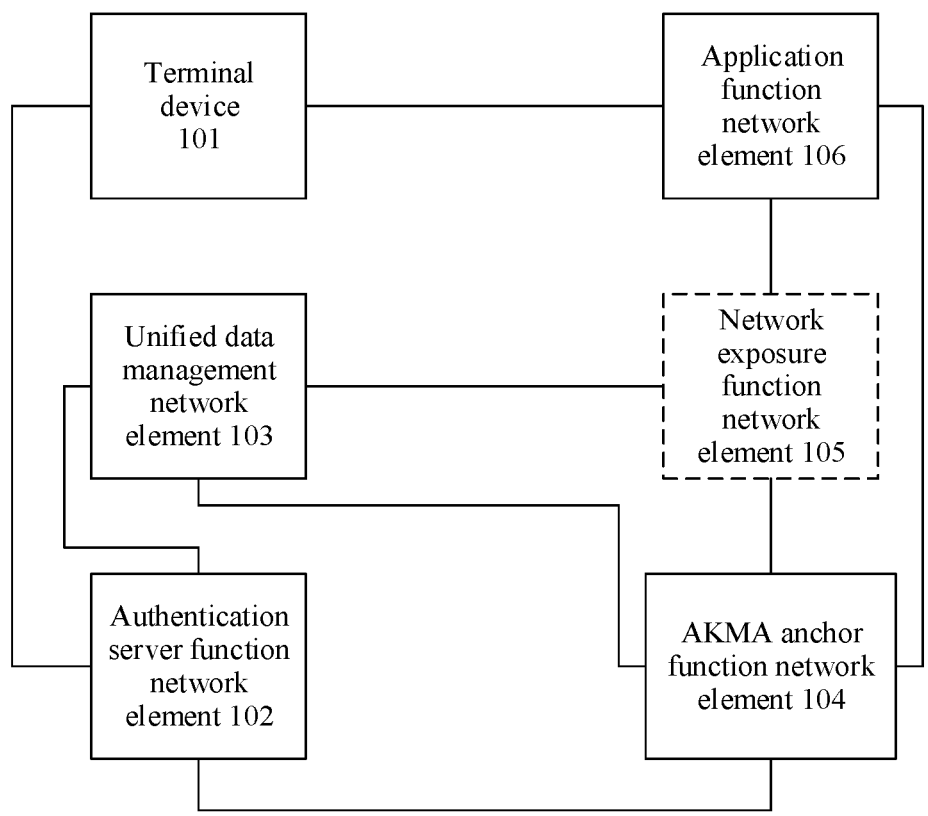
FIG. 5 is a schematic diagram of a network architecture according to this application.

FIG. 5 is a schematic diagram of a network architecture according to this application. The network architecture shown in FIG. 5 is used to implement AKMA service-based data transmission between a terminal device and an application function network element.

In an implementation, the network architecture shown in FIG. 5 may include a terminal device 101, an authentication server function network element 102, a unified data management network element 103, an AKMA anchor function network element 104, a network exposure function network element 105, and an application function network element 106. In this implementation, the application function network element is located outside a core network, and communicates with a core network element by using the network exposure function network element. In this implementation, the network exposure function network element may also be referred to as an AKMA interworking function (interworking function) network element.

In an implementation, the network architecture shown in FIG. 5 may include a terminal device 101, an authentication server function network element 102, a unified data management network element 103, an AKMA anchor function network element 104, and an application function network element 106. In this implementation, the application function network element is located inside a core network, and may directly communicate with a core network element.

This application is described by using an example in which the application function network element is located outside the core network. For a case in which the application function network element is located inside the core network, an interaction procedure between the application function network element and the network exposure function network element in this application may be omitted.

It should be noted that a quantity of network elements in FIG. 5 is used as an example, and does not constitute a limitation on this embodiment of this application. For example, in actual application, a plurality of terminal devices, authentication server function network elements, application function network elements, and the like may be included.

In FIG. 5, for descriptions of the terminal device 101, refer to specific descriptions of the terminal device in the foregoing 5G system. The authentication server function network element 102 may be an AUSF in a 5G core network, or may be a network element configured to implement a function of an AUSF in a future communication system. The unified data management network element 103 may be a UDM in a 5G core network, or may be a network element configured to implement a function of a UDM in a future communication system. The AKMA anchor function network element 104 may be the AAnF in FIG. 2, or may be a network element configured to implement a function of an AAnF in a future communication system. The network exposure function network element 105 may be an NEF in a 5G core network, or may be a network element configured to implement a function of an NEF in a future communication system. The application function network element 106 may be an AF in the 5G system, or may be a network element configured to implement a function of an AF in a future communication system. In this application, an example in which the terminal device 101 is the UE, the authentication server function network element 102 is the AUSF, the unified data management network element 103 is the UDM, the AKMA anchor function network element 104 is the AAnF, the network exposure function network element 105 is the NEF, and the application function network element 106 is the AF is used for description.

In a possible implementation, the NEF obtains first identification information from the UDM, and sends the first identification information to the AAnF, where the first identification information is used by the NEF or the AAnF to determine an AUSF corresponding to Kausf that stores related UE in a direct determining manner or in an auxiliary determining manner. The AUSF corresponding to Kausf of the UE may also be described as an AUSF corresponding to the UE. The direct determining manner means that the NEF or the AAnF may directly determine, by using the first identification information, the AUSF that stores Kausf, to be specific, the AUSF that stores Kausf may be determined without using the first identification information to obtain additional information. The auxiliary determining manner means that after receiving the first identification information, the NEF or the AAnF further needs to obtain additional information to determine the AUSF that stores Kausf.

For example, a method for directly determining the AUSF corresponding to Kausf of the UE may be: The first identification information is or includes identification information of the AUSF, for example, an AUSF ID. The identification information of the AUSF is information in which an AUSF corresponding to Kausf of the UE generates Kausf in a primary authentication process and stores the AUSF of Kausf. The information may be stored by the UDM. Function entities such as the AMF, the SMF, the NEF, and the AAnF may determine a unique AUSF based on the identification information of the AUSF. In this application, the AUSF is an AUSF that generates Kausf and stores Kausf in a primary authentication process for the AUSF corresponding to Kausf of the UE. For another example, an auxiliary determining method may be as follows: When receiving the first identification information, the AAnF obtains, from the UDM based on the first identification information, the identification information of the AUSF corresponding to Kausf of the UE, for example, an AUSF instance ID (AUSF instance identifier, AUSF ID). The AUSF corresponding to Kausf of the UE generates Kausf and stores Kausf in the primary authentication process, so that the AAnF can quickly and accurately determine the AUSF that stores Kausf.

In a possible implementation, the NEF obtains the first identification information from the UDM, and sends the first identification information to the AAnF, where the first identification information is used by the NEF or the AAnF to determine an AUSF corresponding to Kausf that stores Kausf of related UE in a direct determining manner or in an auxiliary determining manner. The direct determining manner means that the NEF or the AAnF may directly determine, by using the first identification information, the AUSF that stores Kausf, to be specific, the AUSF that stores Kausf may be determined without using the first identification information to obtain additional information. The auxiliary determining manner means that after receiving the first identification information, the NEF or the AAnF further needs to obtain additional information to determine the AUSF that stores Kausf. For example, after the NEF obtains the first identification information, the NEF obtains, from the UDM based on the first identification information, the identification information of the AUSF corresponding to Kausf that stores the related UE, for example, the AUSF ID. The NEF sends, to the AAnF, the identification information of the AUSF corresponding to Kausf that stores the related UE. The AAnF receives the identification information of the AUSF from the NEF. The AUSF corresponding to Kausf of the UE generates Kausf and stores Kausf in the primary authentication process, so that the AAnF can quickly and accurately determine the AUSF that stores Kausf.

In a possible implementation, the NEF receives a key request message from the AF, and sends the key request message to the AAnF, where the key request message includes second identification information. The AAnF obtains, from the UDM based on the second identification information, the identification information of the AUSF corresponding to Kausf of the UE. The AUSF corresponding to Kausf of the UE generates Kausf and stores Kausf in the primary authentication process. Therefore, the AAnF can accurately determine the AUSF that stores Kausf.

When the AAnF accurately determines the AUSF that stores Kausf, the AAnF obtains Kakma from the AUSF, may generate Kaf between the UE and the AF and a validity period of Kaf based on Kakma and the AF ID, and sends Kaf and the validity period of Kaf to the AF, so that the AF performs data transmission with the UE by using Kaf, and this improves data transmission security.

The following describes the communication method provided in this application with reference to the network architecture shown in FIG. 5.

Figure 6A:
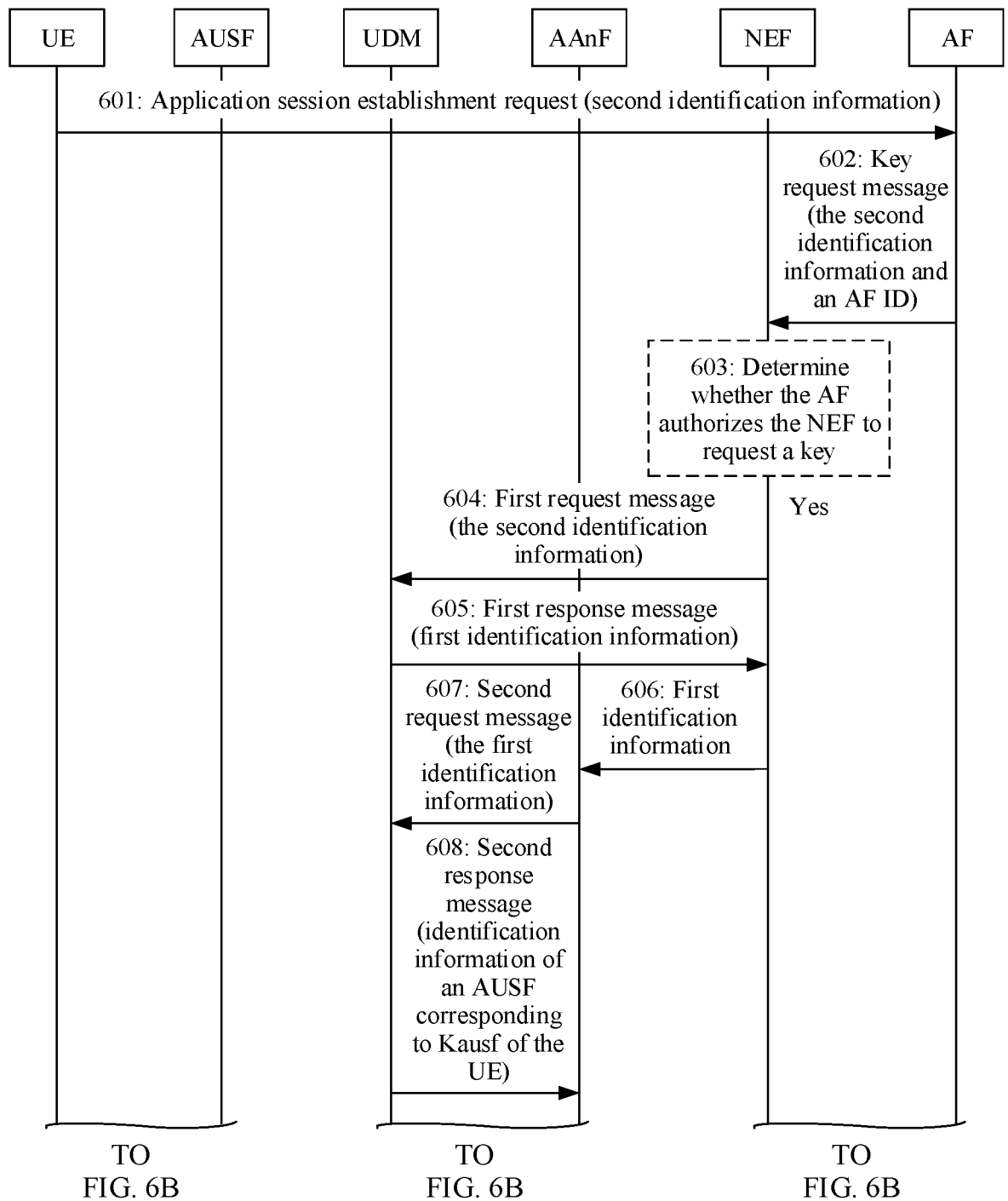
FIG. 6A and FIG. 6B are a schematic flowchart of a communication method according to this application.
Figure 6B:
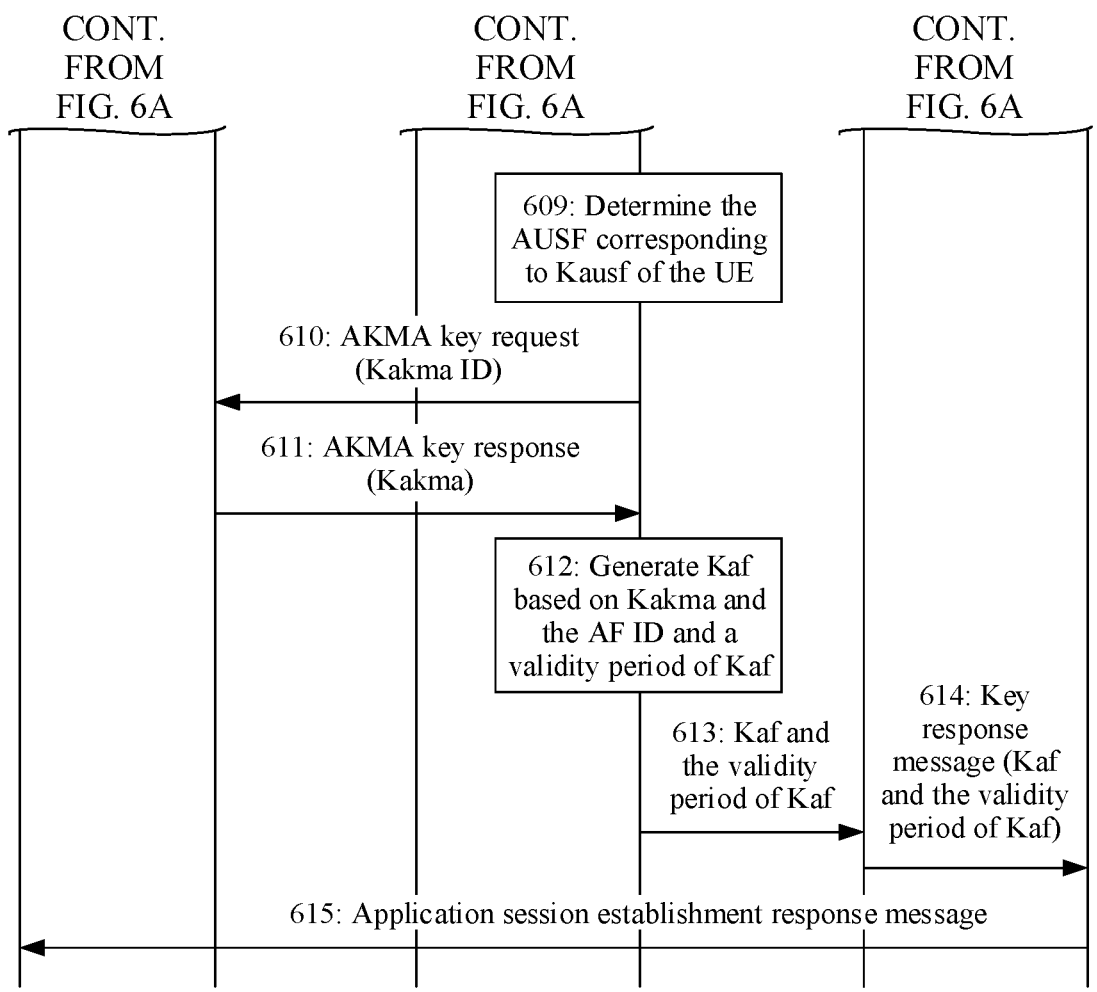

FIG. 6A and FIG. 6B are a schematic flowchart of a communication method according to an embodiment of this application. The flowchart may include but is not limited to the following steps.

Step 601: UE sends an application session establishment request message to an AF. Correspondingly, the AF receives the application session establishment request message from the UE.

The application session establishment request message may be, for example, an application session establishment request message, and is used to trigger establishment of a connection between the UE and the AF. The connection may be used for AKMA service-based data transmission between the UE and the AF. The application session establishment request message may include second identification information.

In an implementation, the second identification information includes a Kakma ID, and the Kakma ID is unique. The Kakma ID that is unique may be used as routing information for searching for an AUSF corresponding to Kausf of the UE. The routing information of the AUSF refers to an initial condition that may be used for searching for and storing identification information of an AUSF corresponding to Kausf of related UE. A UDM, an NEF, or an AAnF may use the routing information of the AUSF as reference content to search for and finally obtain and store the identification information of the AUSF corresponding to Kausf of the related UE. A search process may be direct or indirect. A direct search process means that the identification information, for example, an AUSF ID, of the AUSF corresponding to Kausf of the related UE may be directly determined and stored based on the routing information of the AUSF. For example, the UDM directly determines subscription data of an AKMA service of the UE and/or the identification information of the AUSF based on the Kakma ID, and may further determine the AUSF corresponding to Kausf of the UE. If there is only the subscription data of the AKMA service, it means that the identification information of the AUSF and the subscription data of the AKMA service are stored together. For another example, the UDM may directly determine, based on the Kakma ID, the identification information of the AUSF corresponding to Kausf of the UE. An indirect search process means that intermediate information needs to be first found by using the routing information of the AUSF, and then basic information that stores the identification information of the AUSF corresponding to Kausf of the related UE is finally obtained based on the intermediate information. There may be one or more pieces of intermediate information, and a specific quantity is not limited in the present invention. For example, the UDM may determine an SUPI of the UE based on the Kakma ID, and may determine, based on the SUPI of the UE, the identification information of the AUSF corresponding to Kausf of the UE. In this case, the Kakma ID is used as an initial condition of the routing information of the AUSF to obtain the intermediate information SUPI of the UE, and the intermediate information SUPI of the UE may be used by the UDM to search for the subscription data of the AKMA service of the UE and/or the identification information of the AUSF. Further, the AUSF corresponding to Kausf of the UE may be determined. If there is only the subscription data of the AKMA service, it means that the identification information of the AUSF and the subscription data of the AKMA service are stored together. For another example, the UDM may directly determine, based on the Kakma ID, the identification information of the AUSF corresponding to Kausf of the UE.

The Kakma ID that is unique means that the Kakma ID can uniquely identify Kakma and uniquely find UE. A format of the Kakma ID may be a format that can be used as address information. Being used as the address information may be understood as a form similar to an email, that is, user name@address. For example, the format of the Kakma ID may be a network access identifier (network access identifier, NAI) format, and the NAI format is specifically represented as value@3GPP network information. A value part is a key to reflect uniqueness of the Kakma ID, and a 3GPP network information part may be the same for each Kakma ID of one UE. The value part of the Kakma ID may have a plurality of forms, and a specific form may include at least one of a generated value, a fixed value, and a stable variation value. The generated value indicates that the kakma ID needs to be generated each time. The fixed value is a value that remains unchanged each time and has a special meaning. The stable variation value may be a counter that grows stably. A method for generating a value may be: generated value=KDF(key, parameter 1, parameter 2). The KDF is a key derived function. In a current technology, the KDF is used by the UE and the AUSF to generate a key Kseaf. The KDF is essentially a hash function, and is used as a key derivation algorithm in 3GPP. The key herein may be Kausf, or may be Kakma, or may be an intermediate key or a part of the intermediate key generated by using an authentication method other than 5G-authentication and key management (5G-authentication and key management, 5G-AKA) and enhanced EAP authentication and key agreement (EAP authentication and key agreement, EAP-AKA'). For example, an extended master session key (extended master session key, EMSK) or a part of the EMSK, or a master session key (MSK) or a part of the MSK is generated for an authentication process such as extensible authentication protocol transport layer security (extensible authentication protocol transport layer security, EAP-TLS). The parameter 1 may indicate a purpose, for example, may be a character string "AKMA", or may be an "AKMA ID". The parameter 1 may alternatively indicate application (application, APP) information, for example, a character string "APP ID". The parameter 2 may be a fresh parameter, for example, a user identity SUPI, or a counter that is automatically increased by 1 when each time being used. Only one of the parameter 1 and the parameter 2 may be required. For example, generated value=KDF(key, parameter 1), or generated value=KDF(key, parameter 2). In addition, there may be two or more sub-parameters 1 and two or more sub-parameters 2. For example, generated value=KDF(key, sub-parameter 1, sub-parameter 1, parameter 2), or KDF(key, sub-parameter 1, sub-parameter 2, sub-parameter 2), or KDF(key, sub-parameter 1, sub-parameter 1), or KDF(key, sub-parameter 2, sub-parameter 2). It should be noted that the formula "generated value=KDF(key, parameter 1, parameter 2)" does not pose a limitation that an input parameter of the KDF is not allowed to include another parameter, in other words, the input parameter of the KDF may further include another parameter. For example, in a 3GPP key generation process, an FC value is used. Input parameters traditionally used by 3GPP in key generation, such as the FC value, are not listed one by one herein. It should be further noted that an input sequence of the parameter 1 and the parameter 2 is not limited in the present invention.

After the AUSF generates the Kakma ID, the AUSF may send the Kakma ID to the UDM, and the UDM stores the Kakma ID. The AUSF may send the Kakma ID by using a service—oriented message, for example, a UDM authentication result confirmation request message (Nudm_UEAuthentication_ResultConfirmation Request), or may send the Kakma ID by using a newly defined service—oriented message, for example, a Nudm_UEAKMA_InformationUpdate Request message. After receiving the Kakma ID, the UDM stores the value.

In an implementation, the second identification information includes the Kakma ID and the routing information of the AUSF, and the Kakma ID is not unique. In this implementation, there are a plurality of searching methods: The Kakma ID and the routing information of the AUSF may be used together to search for the identification information of the AUSF corresponding to Kausf of the UE; or only the routing information of the AUSF may be used to search for the identification information of the AUSF corresponding to Kausf of the UE. Alternatively, only the Kakma ID is used to search for the identification information of the AUSF corresponding to Kausf of the UE. The routing information of the AUSF may include identity information of the UE. For example, may be one or more of an SUCI, a generic public subscription identifier (generic public subscription identifier, GPSI), or a globally unique temporary UE identity (globally unique temporary UE identity, GUTI). The SUCI may be generated by the UE. The UDM may decrypt the SUCI of the UE to obtain the SUPI of the UE, and then the UDM may search for subscription data of the AKMA service of the UE, to determine the AUSF corresponding to Kausf of the UE. The GPSI may be preconfigured on the UE and the UDM, and then the UDM may search for the subscription data of the AKMA service of the UE based on the GPSI, to determine the AUSF corresponding to Kausf of the UE. The GUTI may be allocated by the AMF and sent to the UE. The GUTI may be uniquely located to one AMF by a network. The AMF may uniquely locate the SUPI of the UE based on the GUTI, and may further find the AUSF corresponding to the SUPI of the UE, that is, the AUSF corresponding to Kausf of the UE.

Further, a core network element may obtain, from the UDM based on the GPSI or the SUCI, the AUSF that stores Kausf, that is, the AUSF corresponding to Kausf of the UE. The core network element may obtain, from the AMF based on the GUTI, the AUSF that stores Kausf. The core network element may be, for example, the AAnF.

After the AUSF generates the Kakma ID, the AUSF may send the Kakma ID to the UDM, and the UDM stores the Kakma ID. The AUSF may send the Kakma ID by using a service—oriented message, for example, a UDM authentication result confirmation request message (Nudm_UEAuthentication_ResultConfirmation_Request), or may send the Kakma ID by using a newly defined service—oriented message, for example, a Nudm_UEAKMA_InformationUpdate Request message. After receiving the Kakma ID, the UDM stores the value.

In an implementation, the second identification information includes the Kakma ID and a pseudonym of the AUSF, and the Kakma ID is not unique. The pseudonym of the AUSF may be allocated by an operator. An NRF may locate and determine, by combining the pseudonym of the AUSF with content such as a mobile country code (mobile country code, MCC) and a mobile network code (mobile network code, MNC), the identification information of the AUSF corresponding to Kausf of the UE, that is, the AUSF that stores Kausf. The core network element may obtain, from the NRF based on the pseudonym of the AUSF, the AUSF that stores Kausf.

Step 602: The AF sends a key request message to the NEF. Correspondingly, the NEF receives the key request message from the AF.

The key request message may be, for example, a key request message, and requests a communication key between the AF and the UE, that is, Kaf between the AF and the UE. The key request message may include the second identification information, that is, the second identification information received by the AF from the UE. The key request message may alternatively include identification information of the AF, for example, an AF ID, used to identify an AF with which the UE performs AKMA service-based data transmission.

In this application, the AF is located outside the 5G core network. When communicating with the core network element, the AF needs to use the NEF. Therefore, the AF sends the key request message to the NEF.

The AF may send the key request message to the NEF when receiving the application session establishment request message, or may send the key request message to the NEF when Kaf between the AF and the UE expires. Kaf expires when, for example, current system time is not within a validity period of Kaf.

Step 603: The NEF determines whether the AF authorizes the NEF to request a key.

When receiving the key request message from the AF, the NEF determines whether the AF authorizes the NEF to request the key, in other words, determines whether the AF authorizes the NEF to obtain Kaf between the AF and the UE from the AAnF. For a process in which the NEF determines whether the AF authorizes the NEF to request the key, refer to related descriptions in the current technology.

If the NEF is authorized by the AF to request the key, step 604 is performed; or if the NEF is not authorized to request the key, the NEF feeds back a non-authorized notification message to the AF, so that the AF authorizes the NEF to request the key.

This step is an optional step. This means that the NEF may not check whether the AF is authorized.

Step 604: When a determining result in step 603 is yes, the NEF sends a first request message to the UDM. Correspondingly, the UDM receives the first request message from the NEF.

The first request message may be, for example, a Nudm SDM Get message, and requests first identification information. The first request message may include the second identification information. Optionally, the first request message may alternatively include the identification information of the AF, for example, the AF ID.

In an implementation, the second identification information includes a Kakma ID that is unique. When receiving the first request message, the UDM may determine the UE based on the Kakma ID, and then determine the first identification information, where the first identification information includes the SUPI of the UE.

In an implementation, the second identification information includes a Kakma ID that is not unique and the identity information of the UE, and the identity information of the UE includes the GPSI or the SUCI. When receiving the first request message, the UDM may determine the UE based on the GPSI or the SUCI, and further determine the first identification information, where the first identification information includes the SUPI of the UE.

In an implementation, the second identification information includes the Kakma ID that is unique and the identity information of the UE, and the identity information of the UE includes the GPSI. When receiving the first request message, the UDM may determine the UE based on the GPSI, and then determine the first identification information, where the first identification information includes the SUPI of the UE.

That the UDM determines the SUPI of the UE may be understood as that the UDM determines UE corresponding to the Kakma ID. The Kakma ID and/or the SUPI of the UE may be used by the UDM to further search for the subscription data of the AKMA service of the UE, and then determine the identification information of the AUSF corresponding to Kausf of the UE. It may be understood that the Kakma ID and/or the SUPI of the UE are/is used to determine the AUSF corresponding to Kausf of the UE. In other words, the first identification information is used to determine the AUSF corresponding to Kausf of the UE.

Step 605: The UDM sends a first response message to the NEF. Correspondingly, the NEF receives the first response message from the UDM.

The first response message may be, for example, an Nudm SDM Get response message, and is used to respond to the first request message. The first response message includes the first identification information determined by the UDM.

Step 606: The NEF sends the first identification information to the AAnF.

Correspondingly, an AAnF receives the first identification information from the NEF.

When receiving the first identification information from the UDM, the NEF sends the first identification information to the AAnF, for example, sends the first identification information to the AAnF by using a submit Key Request message. In other words, the first identification information is carried in the submit Key Request message. When receiving the first identification information, that is, when receiving the SUPI of the UE, the UDM may determine the UE based on the SUPI of the UE, and search for the subscription data of the AKMA service of the UE. Alternatively, the UDM may directly search for the subscription data of the AKMA service of the UE based on the SUPI of the UE.

Further, the submit Key Request message may further carry the identification information of the AF, for example, the AF ID, so that when obtaining Kakma, the AAnF generates Kaf between the UE and the AF and the validity period of Kaf based on Kakma and the AF ID.

Further, the submit Key Request message may further include the second identification information, that is, the second identification information received by the NEF from the AF. The second identification information includes the Kakma ID, so that after determining the AUSF corresponding to Kausf of the UE, the AAnF obtains Kakma corresponding to the Kakma ID from the AUSF.

Step 607: The AAnF sends a second request message to the UDM. Correspondingly, the UDM receives the second request message from the AAnF.

The second request message may be, for example, an AKMA service request (AKMA service request) message, and requests the identification information of the AUSF corresponding to Kausf of the UE.

When the second request message includes the first identification information, the first identification information is used to obtain data related to the AKMA service of the UE, and may include the identification information of the AUSF corresponding to Kausf of the UE, and may further include the subscription data of the AKMA service of the UE. For example, the first identification information includes the SUPI of the UE, and the UDM may search for the subscription data of the AKMA service of the UE based on the SUPI of the UE.

When the second request message includes the second identification information, the second identification information includes the Kakma ID that is unique. The UDM may determine the UE based on the Kakma ID, and then obtain data related to the AKMA service of the UE, including the identification information that determines the AUSF corresponding to Kausf of the UE, and the subscription data of the AKMA service of the UE may also be included.

In an implementation, the subscription data of the AKMA service of the UE may include the identification information of the AUSF corresponding to Kausf of the UE, and the identification information of the AUSF corresponding to Kausf of the UE may be an AUSF ID corresponding to Kausf of the UE, address information of the AUSF corresponding to Kausf of the UE, serving node (serving node) information of the AUSF corresponding to Kausf of the UE, or the like. The subscription data of the AKMA service of the UE may alternatively include one or more of information such as an AKMA service that can be used by the UE, information about an AF that can provide the AKMA service, or slice information. The AKMA service that can be used by the UE may be represented by a data network name (data network name, DNN). The AF information may be information about binding between the AF ID and the DNN. The slice information may be, for example, network slice selection assistance information (network slice selection assistance information, NSSAI).

In an implementation, the identification information of the AUSF corresponding to Kausf of the UE is not carried in the subscription data of the AKMA service of the UE. When determining the subscription data of the AKMA service of the UE, the UDM may determine, based on the subscription data of the AKMA service of the UE, the identification information of the AUSF corresponding to Kausf of the UE. Alternatively, the UDM may search for, based on the determined UE, the AUSF corresponding to Kausf of the UE, to determine the identification information of the AUSF corresponding to Kausf of the UE.

Step 608: The UDM sends a second response message to the AAnF. Correspondingly, the AAnF receives the second response message from the UDM.

When determining the identification information of the AUSF corresponding to Kausf of the UE, the UDM sends the second response message to the AAnF. The second response message may be, for example, an AKMA service response (AKMA service response) message, and is used to respond to the second request message.

In an implementation, the second response message includes the subscription data of the AKMA service of the UE, and the subscription data of the AKMA service of the UE includes the identification information of the AUSF corresponding to Kausf of the UE.

In an implementation, the second response message includes the subscription data of the AKMA service of the UE and the identification information of the AUSF corresponding to Kausf of the UE.

The AAnF may perform authorization detection based on the subscription data of the AKMA service of the UE. Specifically, the AAnF may check and determine whether the UE can perform the AKMA service by using the AF indicated by the AF ID. If the authorization detection succeeds, step 609 is performed. It should be noted herein that this application provides three methods for the AAnF to obtain the subscription data of the AKMA service of the UE. One method is that the AAnF directly obtains the subscription data of the AKMA service of the UE by using the UDM (step 608), one method is that the AAnF obtains the subscription data of the AKMA service of the UE by using the NEF (step 808), and one method is that the AAnF obtains the subscription data of the AKMA service of the UE by using the AUSF (step 611). The three methods do not need to be implemented together. Only one of them needs to be used.

Step 609: The AAnF determines the AUSF corresponding to Kausf of the UE.

When receiving the second response message, the AAnF may determine, based on the identification information of the AUSF corresponding to Kausf of the UE, the AUSF corresponding to Kausf of the UE.

Optionally, if the subscription data of the AKMA service of the UE is carried in step 608, before determining the AUSF corresponding to Kausf of the UE, the AAnF performs authorization detection on the UE and/or the AF.

The AAnF performs authorization detection on the UE. Specifically, the AAnF determines, based on the subscription data of the AKMA service of the UE, whether the UE can use the AKMA service. If it is determined that the UE can use the AKMA service, the UE passes the authorization detection. If it is determined that the UE cannot use the AKMA service, the AAnF does not perform step 610, and feeds back, to the AF by using the NEF, a notification message indicating that the UE cannot use the AKMA service.

The AAnF performs authorization detection on the AF. Specifically, the AAnF determines, based on the subscription data of the AKMA service of the UE, whether the AF can provide the AKMA service for the UE. If the AF can provide the AKMA service for the UE, the AF passes the authorization detection. If the AF cannot provide the AKMA service for the UE, the AAnF does not perform step 610, and feeds back, to the AF by using the NEF, a notification message indicating that the AF cannot provide the AKMA service for the UE. For example, whether the subscription data of the AKMA service of the UE includes the AF ID is determined. If the subscription data includes the AF ID, the AF may provide the AKMA service for the UE; or if the subscription data does not include the AF ID, the AF cannot provide the AKMA service for the UE. For another example, whether the service that can be provided by the AF is included in the AKMA service that can be used by the UE. If the service is included, the AF may provide the AKMA service for the UE. If the service is not included, the AF cannot provide the AKMA service for the UE.

When the UE or the AF passes the authorization detection, the AAnF may determine, based on the identification information of the AUSF corresponding to Kausf of the UE, the AUSF corresponding to Kausf of the UE.

Step 610: The AAnF sends an AKMA key request message to the AUSF. Correspondingly, the AUSF receives the key request message from the AAnF.

The AAnF sends the AKMA key request message to the AUSF corresponding to Kausf of the UE, where the AKMA key request message includes the Kakma ID. The AKMA key request message may be, for example, an AKMA key request message, and requests Kakma corresponding to the Kakma ID.

Step 611: The AUSF sends an AKMA key response message to the AAnF. Correspondingly, the AAnF receives the AKMA key response message from the AUSF.

When receiving the AKMA key request message carrying the Kakma ID, the AUSF determines, based on the Kakma ID, Kakma corresponding to the Kakma ID, and sends, to the AAnF by using the AKMA key response message, Kakma corresponding to the Kakma ID. That is, the Kakma is carried in the AKMA key response message. The AKMA key response message may be, for example, an AKMA key response message, and is used to respond to the AKMA key request message.

Optionally, if the subscription data of the AKMA service of the UE is not carried in step 608, the AKMA key response message may include the subscription data of the AKMA service of the UE.

Step 612: The AAnF generates Kaf and a validity period of Kaf.

The AAnF generates Kaf and the validity period of Kaf based on Kakma and the AF ID.

If the subscription data of the AKMA service of the UE is carried in step 611, the AAnF may perform authorization detection based on the subscription data of the AKMA service of the UE. Specifically, the AAnF may check and determine whether the UE can perform the AKMA service by using the AF indicated by the AF ID. For specific authorization detection, refer to descriptions of the authorization detection in step 609. If the authorization detection succeeds, step 612 is performed.

Step 613: The AAnF sends Kaf and the validity period of Kaf to the NEF. Correspondingly, the NEF receives Kaf and the validity period of Kaf from the AAnF.

The AAnF may send Kaf and the validity period of Kaf to the NEF by using a submit key response confirm message, in other words, the validity period of Kaf and Kaf are carried in the submit key response confirm message.

Step 614: The NEF sends a key response message to the AF. Correspondingly, the AF receives the key response message from the NEF.

The key response message may be, for example, a key response message, and is used to respond to the key request message in step 602. The key response message includes Kaf and the validity period of Kaf.

Step 615: The AF sends an application session establishment response message to the UE. Correspondingly, the UE receives the application session establishment response message from the AF.

The application session establishment response message may be, for example, an application session establishment response message, and is used to respond to the application session establishment request message in step 601.

After step 615, the AF may encrypt, within the validity period of Kaf by using Kaf, data sent by the AF to the UE, so that data transmission security can be improved. Correspondingly, when receiving the data from the AF, the UE may decrypt the data by using Kaf. A process in which the UE generates Kaf is similar to a process in which the AAnF generates Kaf. Refer to related descriptions in the current technology.

In the embodiment shown in FIG. 6A and FIG. 6B, the NEF obtains the first identification information from the UDM, and sends the first identification information to the AAnF. The AAnF obtains, from the UDM based on the first identification information, the identification information of the AUSF corresponding to Kausf of the UE. Therefore, the AAnF can quickly and accurately determine the AUSF that stores Kausf.

In the embodiment shown in FIG. 6A and FIG. 6B, an example in which the AF is located outside the core network is used. If the AF is located inside the core network, related steps of interaction with the NEF in FIG. 6A and FIG. 6B may be deleted, for example, step 603 and step 606, and step 604 and step 605 are changed to an interaction procedure between the AAnF and the UDM.

Figure 7:
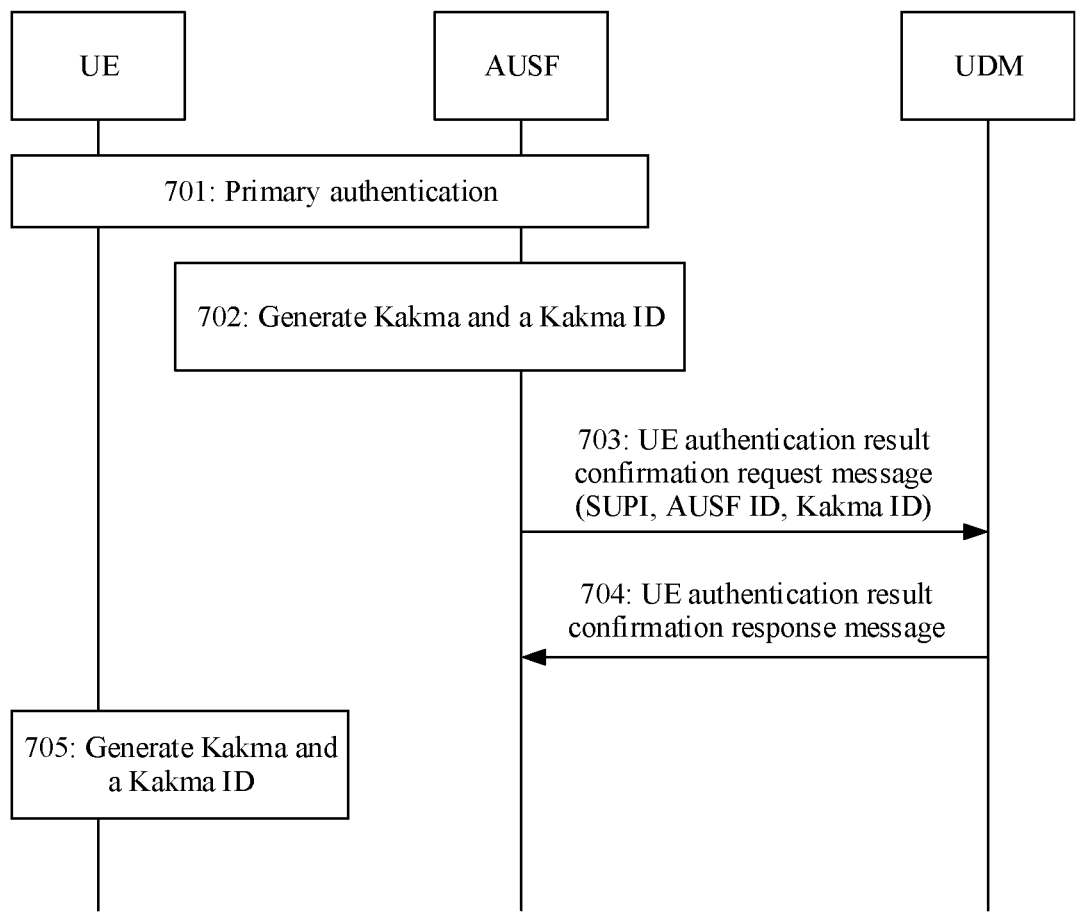
FIG. 7 is a schematic flowchart before step 601 in FIG. 6A and FIG. 6B.

Optionally, before step 601, step 701 to step 705 are further included, as shown in FIG. 7.

Step 701: UE and an AUSF perform a primary authentication process.

The UE and the AUSF perform the primary authentication process. For details, refer to detailed descriptions of the primary authentication process in FIG. 3. Details are not described herein again.

Step 702: The AUSF generates Kakma and a Kakma ID.

After the primary authentication process, the AUSF uses Kausf generated during the primary authentication process to generate Kakma and generates the Kakma ID for Kakma.

In an implementation, the Kakma ID generated by the AUSF is unique, that is, the Kakma ID is globally unique. One Kakma ID is used to uniquely identify one Kakma, and different Kakma correspond to different Kakma IDs. Further, the Kakma ID is unique, one Kakma ID may independently identify one UE, and different UEs correspond to different Kakma IDs. It may be understood that the AUSF may generate different Kakma and Kakma IDs for the different UEs.

In an implementation, the Kakma ID generated by the AUSF is not unique. In other words, the Kakma ID is not globally unique. Further, the Kakma ID is not unique, and one Kakma ID cannot independently identify one UE.

Step 703: The AUSF sends the Kakma ID to a UDM. The AUSF sends a UE authentication result confirmation request message or a newly defined service—oriented message to the UDM. Correspondingly, the UDM receives the UE authentication result confirmation request message from the AUSF, or receives the newly defined service-based message. Step 703 and step 704 are described by using an example in which the service-based message is the UE authentication result confirmation request message and a UE authentication result confirmation response message respectively.

The UE authentication result confirmation request message may include a subscriber permanent identifier (subscriber permanent identifier, SUPI) of the UE and an AUSF ID. The SUPI of the UE is used to identify the UE. The AUSF ID is used to identify an AUSF corresponding to Kausf of the UE, that is, used to identify an AUSF that stores Kausf.

If the Kakma ID is unique, the UE authentication result confirmation request message carries the Kakma ID, which can be used by the UDM to search for subscription data of an AKMA service of the UE. When the Kakma ID is not unique, the UE authentication result confirmation request message may also include the Kakma ID.

For the subscription data of the AKMA service of the UE, refer to specific descriptions of the subscription data of the AKMA service of the UE in step 607.

Step 704: The UDM sends the UE authentication result confirmation response message to the AUSF. Correspondingly, the AUSF receives the UE authentication result confirmation response message from the UDM.

Optionally, before the UDM sends the UE authentication result confirmation response message to the AUSF, if the UE authentication result confirmation request message carries the Kakma ID, the UDM stores the Kakma ID in the subscription data of the AKMA service of the UE, so that when the UDM receives a second request message, the subscription data of the AKMA service of the UE may be searched for based on first identification information.

Optionally, the UDM replies with the subscription data of the AKMA service of the UE in the UE authentication result confirmation response message. After receiving the subscription data of the AKMA service, the AUSF stores the subscription data of the UE. In step 611, the AUSF may send the stored subscription data of the AKMA service of the UE corresponding to the Kakma ID to the AAnF. The AAnF may perform authorization detection based on the subscription data of the AKMA service. Specifically, the AAnF may check and determine whether the UE can perform the AKMA service by using the AF indicated by the AF ID. For specific descriptions, refer to step 609. If the authorization detection succeeds, step 612 is performed. When the AF is inside a SGC, the AAnF can obtain the subscription data of the AKMA service by using this method.

Step 705: The UE generates Kakma and the Kakma ID.

After the primary authentication process, if the UE is about to initiate the AKMA service, the UE uses Kausf to generate Kakma and generates the Kakma ID for Kakma.

Figure 8A:
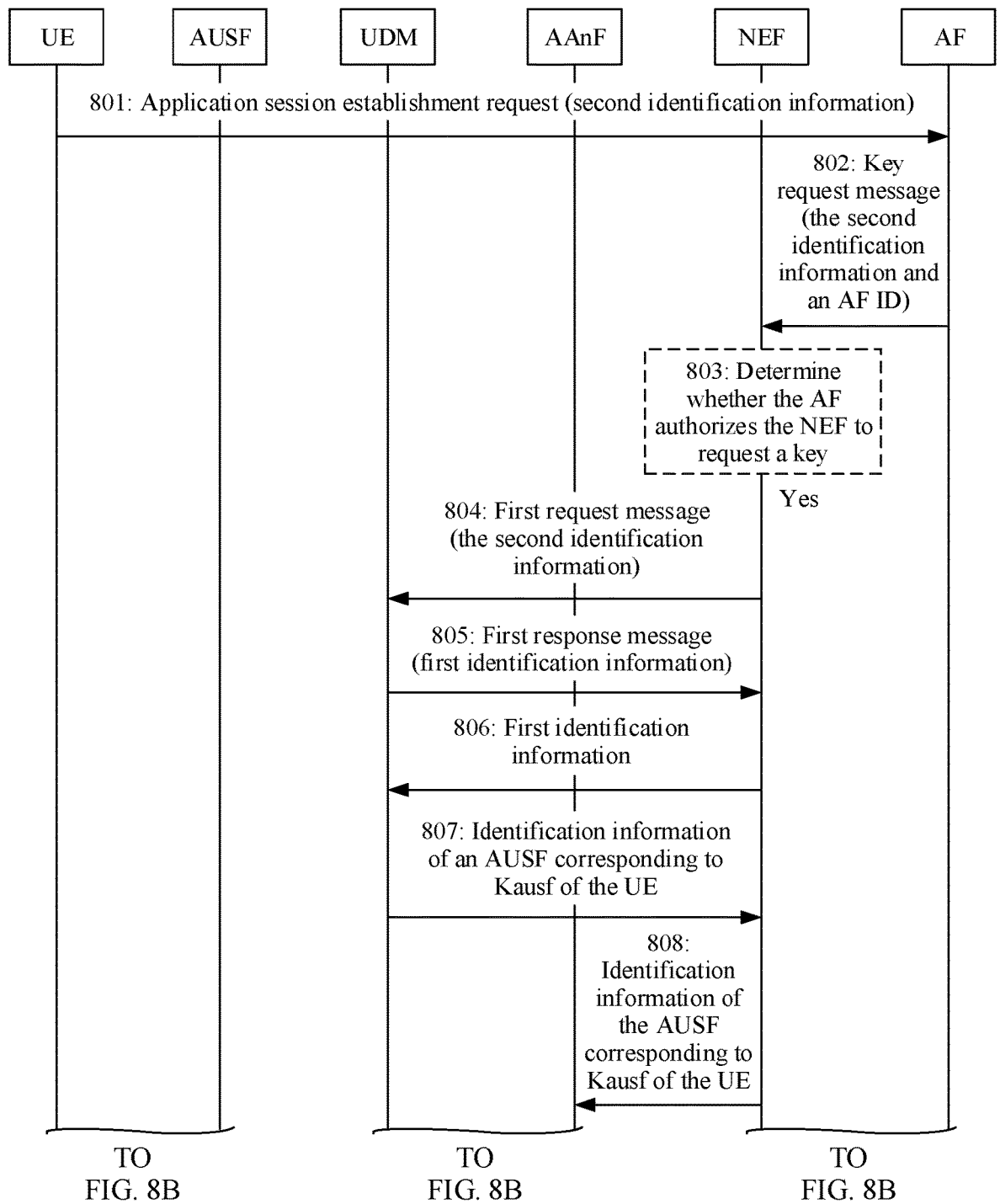
FIG. 8A and FIG. 8B are a schematic flowchart of another communication method according to this application.
Figure 8B:
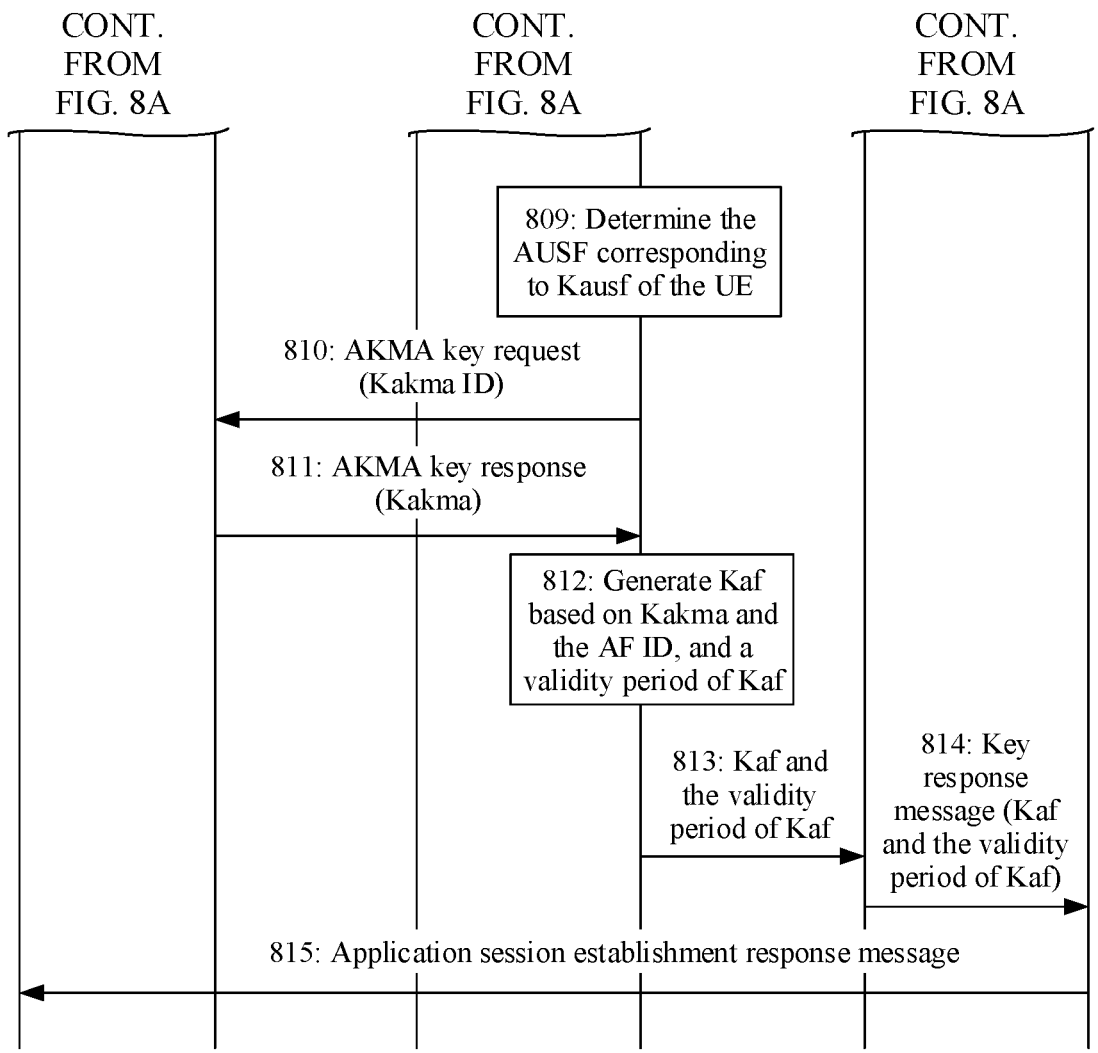

FIG. 8A and FIG. 8B are a schematic flowchart of another communication method according to an embodiment of this application. The flowchart may include but is not limited to the following steps.

Step 801: UE sends an application session establishment request message to an AF. Correspondingly, the AF receives the application session establishment request message from the UE.

Step 802: The AF sends a key request message to an NEF. Correspondingly, the NEF receives the key request message from the AF.

Step 803: The NEF determines whether the AF authorizes the NEF to request a key.

Step 804: When a determining result in step 803 is yes, the NEF sends a first request message to the UDM. Correspondingly, the UDM receives the first request message from the NEF.

Step 805: The UDM sends a first response message to the NEF. Correspondingly, the NEF receives the first response message from the UDM.

For an implementation process of step 801 to step 805, refer to specific descriptions of step 601 to step 605 in the procedure shown in FIG. 6A and FIG. 6B. Details are not described herein again.

Step 806: The NEF sends first identification information to the UDM. Correspondingly, an AAnF receives the first identification information from the NEF.

The first identification information sent by the NEF to the UDM may be carried in an Nudm_UECM_Get message. The first identification information, for example, an SUPI of the UE, requests subscription data of the UE. The Nudm_UECM_Get message may alternatively carry AKMA service indication information. The Nudm_UECM_Get message carries the SUPI of the UE and the AKMA service indication information, and requests data related to the AKMA service, for example, subscription data of the AKMA service of the UE and identification information of an AUSF corresponding to Kausf of the UE. The AKMA service indication information indicates that related content of the AKMA service is requested, and specifically, "AKMA" may be used as the indication information. For example, Nudm_UECM_Get (SUPI, AKMA).

Step 807: The UDM sends, to the NEF, the identification information of the AUSF corresponding to Kausf of the UE. Correspondingly, the NEF receives the identification information of the AUSF corresponding to Kausf of the UE from the UDM.

When receiving the Nudm_UECM_Get message, the UDM determines, based on the SUPI of the UE and the AKMA service indication information, the subscription data of the AKMA service of the UE and/or the identification information of the AUSF corresponding to Kausf of the UE.

In an implementation, the subscription data of the AKMA service of the UE may include the identification information of the AUSF corresponding to Kausf of the UE. In another implementation, the identification information of the AUSF corresponding to Kausf of the UE is not carried in the subscription data of the AKMA service of the UE. In this case, the identification information of the AUSF corresponding to Kausf of the UE and/or the subscription data of the AKMA service of the UE may be carried.

The UDM determines the data related to the AKMA service of the UE. The determining includes determining at least one of the identification information of the AUSF corresponding to Kausf of the UE and the subscription data of the AKMA service of the UE. When the identification information of the AUSF corresponding to Kausf of the UE is determined, the identification information of the AUSF corresponding to Kausf of the UE may be sent to the NEF. For example, the identification information of the AUSF corresponding to Kausf of the UE may be sent to the NEF by using an Nudm_UECM_Get response message.

Optionally, for a case in which the identification information of the AUSF corresponding to Kausf of the UE is not carried in the subscription data of the AKMA service of the UE, the Nudm_UECM_Get response message may include the identification information of the AUSF corresponding to Kausf of the UE and the subscription data of the AKMA service of the UE.

Step 804 to step 807 are an implementation. To be specific, the NEF first obtains the first identification information from the UDM, and then the NEF obtains, from the UDM based on the first identification information, the identification information of the AUSF corresponding to Kausf of the UE. In another implementation, step 804 and step 806 are combined, and step 805 and step 807 are combined. To be specific, the NEF directly obtains, from the UDM, the first identification information and the identification information of the AUSF corresponding to Kausf of the UE. For example, the NEF sends the first request message to the UDM, where the first request message includes second identification information, and specifically includes the Kakma ID and/or identity information of the UE. When receiving the first request message, the UDM determines the SUPI of the UE based on the Kakma ID and/or the identity information of the UE, and then determines data related to the AKMA service of the UE. The data related to the AKMA service may include the identification information of the AUSF corresponding to Kausf of the UE, and may further include the subscription data of the AKMA service of the UE. The UDM sends the first response message to the NEF, where the first response message includes the first identification information and the identification information of the AUSF corresponding to Kausf of the UE. The identification information of the AUSF corresponding to Kausf of the UE may be carried in the subscription data of the AKMA service of the UE, or may not be carried in the subscription data of the AKMA service of the UE.

Step 808: The NEF sends, to the AAnF, the identification information of the AUSF corresponding to Kausf of the UE. Correspondingly, the AAnF receives the identification information of the AUSF corresponding to Kausf of the UE from the NEF.

The NEF may send, to the AAnF by using a submit Key Request message, the identification information of the AUSF corresponding to Kausf of the UE. The submit Key Request message may alternatively include an AF ID. The submit Key Request message may further include the second identification information, for example, the Kakma ID, so that after determining the AUSF corresponding to Kausf of the UE, the AAnF obtains Kakma corresponding to the Kakma ID from the AUSF. If the subscription data of the AKMA service of the UE is obtained in step 807, the subscription data of the AKMA service of the UE further needs to be included in this step.

Step 809: The AAnF determines the AUSF corresponding to Kausf of the UE.

When receiving the identification information of the AUSF corresponding to Kausf of the UE, the AAnF may determine, based on the identification information of the AUSF corresponding to Kausf of the UE, the AUSF corresponding to Kausf of the UE.

Optionally, if the subscription data of the AKMA service of the UE is not carried in step 808, before determining the AUSF corresponding to Kausf of the UE, the AAnF performs authorization detection on the AF. Specifically, the AAnF may determine, based on the AF ID and preconfiguration information, whether the AF can provide the AKMA service for the UE. The preconfiguration information may be configured by an operator by using a management plane.

Optionally, if the subscription data of the AKMA service of the UE is carried in step 808, before determining the AUSF corresponding to Kausf of the UE, the AAnF performs authorization detection on the UE and/or the AF. For specific descriptions, refer to corresponding descriptions in step 609.

Step 810: The AAnF sends an AKMA key request message to the AUSF. Correspondingly, the AUSF receives the key request message from the AAnF.

Step 811: The AUSF sends an AKMA key response message to the AAnF. Correspondingly, the AAnF receives the AKMA key response message from the AUSF.

Step 812: The AAnF generates Kaf and a validity period of Kaf.

Step 813: The AAnF sends Kaf and the validity period of Kaf to the NEF. Correspondingly, the NEF receives Kaf and the validity period of Kaf from the AAnF.

Step 814: The NEF sends the key response message to the AF. Correspondingly, the AF receives the key response message from the NEF.

Step 815: The AF sends an application session establishment response message to the UE. Correspondingly, the UE receives the application session establishment response message from the AF.

For an implementation process of step 810 to step 815, refer to specific descriptions of step 610 to step 615 in the procedure shown in FIG. 6A and FIG. 6B. Details are not described herein again.

In the embodiment shown in FIG. 8A and FIG. 8B, the NEF obtains the first identification information from the UDM, obtains, from the UDM based on the first identification information, the identification information of the AUSF corresponding to Kausf of the UE, and sends the identification information of the AUSF corresponding to Kausf of the UE to the AAnF. Therefore, the AAnF can quickly and accurately determine the AUSF that stores Kausf.

In the embodiment shown in FIG. 8A and FIG. 8B, an example in which the AF is located outside the core network is used. If the AF is located inside the core network, related steps of interaction with the NEF in FIG. 8A and FIG. 8B may be deleted, for example, step 803 and step 808, and step 804 to step 807 are changed to an interaction procedure between the AAnF and the UDM.

Optionally, before step 801, step 701 to step 705 are further included, as shown in FIG. 7. For details, refer to the descriptions of FIG. 7.

Figure 9:
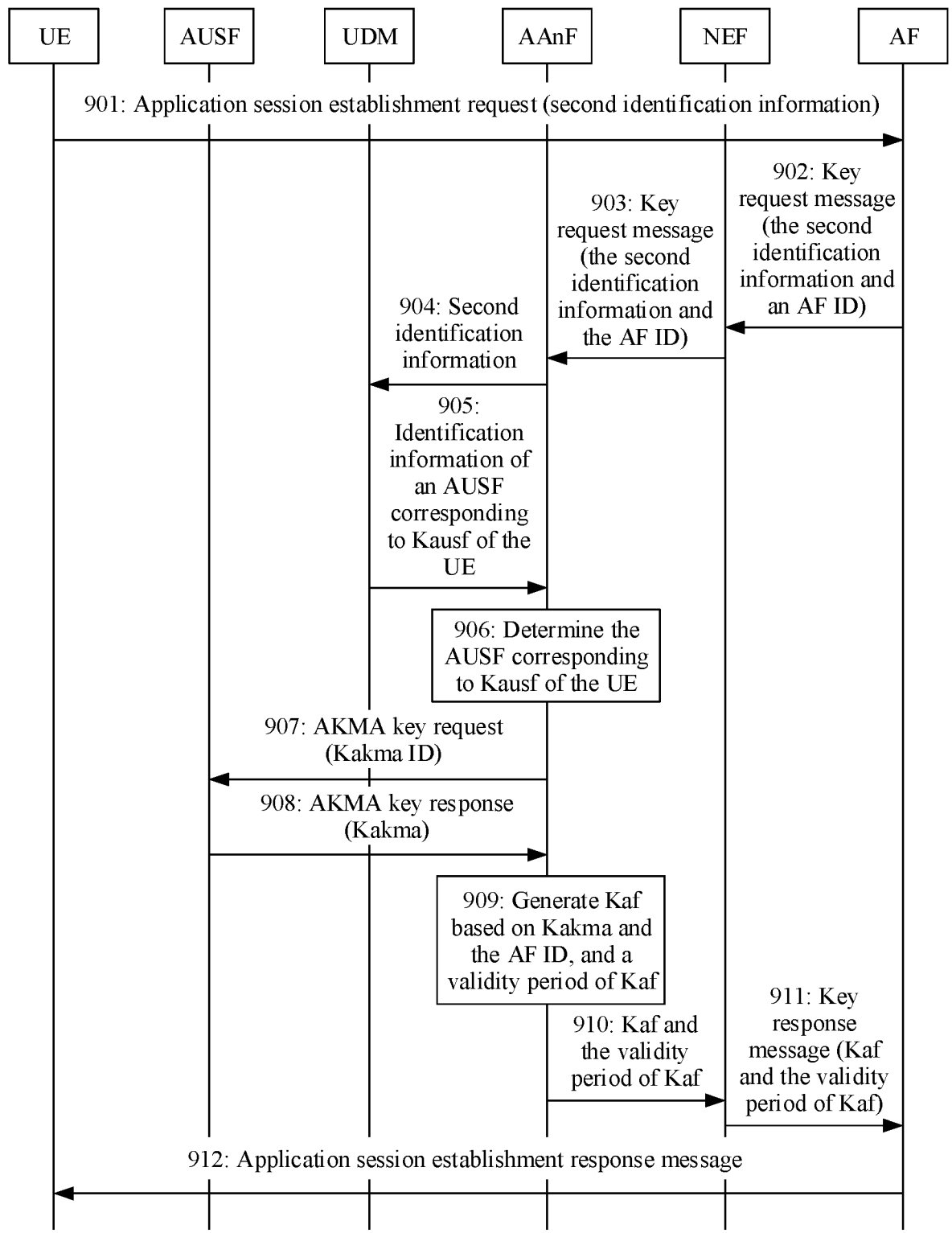
FIG. 9 is a schematic flowchart of still another communication method according to this application.

FIG. 9 is a schematic flowchart of still another communication method according to an embodiment of this application. The flowchart may include but is not limited to the following steps.

Step 901: UE sends an application session establishment request message to an AF. Correspondingly, the AF receives the application session establishment request message from the UE.

Step 902: The AF sends a key request message to an NEF. Correspondingly, the NEF receives the key request message from the AF.

For implementation processes of step 901 and step 902, refer to specific descriptions of step 601 and step 602 in the procedure shown in FIG. 6A and FIG. 6B. Details are not described herein again.

Step 903: The NEF sends the key request message to an AAnF. Correspondingly, the AAnF receives the key request message from the NEF.

For content carried in the key request message in step 903, refer to the content carried in the key request message in step 602. Details are not described herein again.

Step 904: The AAnF sends second identification information to the UDM. Correspondingly, the UDM receives the second identification information from the AAnF.

The AAnF may send the second identification information to the UDM by using an Nudm_UECM_Get message.

In an implementation, the Nudm_UECM_Get message includes the second identification information and AKMA service indication information. For the AKMA service indication information, refer to descriptions of the AKMA service indication information in step 806. When receiving the Nudm_UECM_Get message, the UDM determines an SUPI of the UE based on the second identification information, and determines, based on the SUPI of the UE and the AKMA service indication information, subscription data of an AKMA service of the UE and/or identification information of an AUSF corresponding to Kausf of the UE.

In an implementation, the Nudm_UECM_Get message includes the second identification information. When receiving the Nudm_UECM_Get message, the UDM determines an SUPI of the UE based on the second identification information, and determines, based on the SUPI of the UE, subscription data of an AKMA service of the UE and/or identification information of an AUSF corresponding to Kausf of the UE.

Step 905: The UDM sends, to the AAnF, the identification information of the AUSF corresponding to Kausf of the UE. Correspondingly, the AAnF receives the identification information of the AUSF corresponding to Kausf of the UE from the UDM.

The UDM may send, to the AAnF by using an Nudm_UECM_Get response message, the identification information of the AUSF corresponding to Kausf of the UE.

Optionally, for a case in which the identification information of the AUSF corresponding to Kausf of the UE is not carried in the subscription data of the AKMA service of the UE, the Nudm_UECM_Get response message may include the identification information of the AUSF corresponding to Kausf of the UE and the subscription data of the AKMA service of the UE.

Step 906: The AAnF determines the AUSF corresponding to Kausf of the UE.

In an implementation, if the AAnF receives the subscription data of the AKMA service of the UE, for step 906, refer to corresponding descriptions in step 609. Details are not described herein again.

In an implementation, if the AAnF does not receive the subscription data of the AKMA service of the UE, for step 906, refer to corresponding descriptions in step 809. Details are not described herein again.

Step 907: The AAnF sends an AKMA key request message to the AUSF. Correspondingly, the AUSF receives the key request message from the AAnF.

Step 908: The AUSF sends an AKMA key response message to the AAnF. Correspondingly, the AAnF receives the AKMA key response message from the AUSF.

Step 909: The AAnF generates Kaf and a validity period of Kaf.

Step 910: The AAnF sends Kaf and the validity period of Kaf to the NEF. Correspondingly, the NEF receives Kaf and the validity period of Kaf from the AAnF.

Step 911: The NEF sends the key response message to the AF. Correspondingly, the AF receives the key response message from the NEF.

Step 912: The AF sends an application session establishment response message to the UE. Correspondingly, the UE receives the application session establishment response message from the AF.

For an implementation process of step 907 to step 912, refer to specific descriptions of step 610 to step 615 in the procedure shown in FIG. 6A and FIG. 6B. Details are not described herein again.

In the embodiment shown in FIG. 9, when receiving the key request message from the AF, the NEF directly forwards the key request message to the AAnF, and the AAnF autonomously obtains, from the UDM, the identification information of the AUSF corresponding to Kausf of the UE. Therefore, the AAnF can quickly and accurately determine the AUSF corresponding to Kausf of the UE.

Optionally, before step 901, step 701 to step 705 are further included, as shown in FIG. 7. For details, refer to the descriptions of FIG. 7.

A difference between the embodiment shown in FIG. 9 and the embodiments shown in FIG. 6A and FIG. 6B and FIG. 8A and FIG. 8B lies in that, in FIG. 9, the NEF does not determine whether the AF authorizes the NEF to request a key, and the NEF directly forwards, to the AAnF, the key request message sent by the AF, so that an implementation process is simpler.

If the AF is located inside a core network, step 903 may be deleted from FIG. 9.

In correspondence to the method provided in the foregoing method embodiments, an embodiment of this application further provides a corresponding apparatus. The apparatus includes corresponding modules configured to perform the foregoing embodiments. The module may be software, hardware, or a combination of software and hardware.

Figure 10:
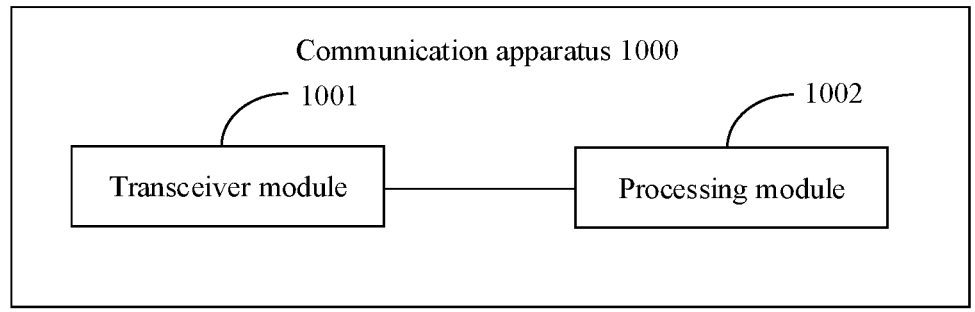
FIG. 10 is a schematic diagram of a structure of a communication apparatus according to this application.

FIG. 10 is a schematic diagram of a structure of a communication apparatus according to this application. The communication apparatus 1000 shown in FIG. 10 includes a transceiver module 1001 and a processing module 1002.

In a possible design, the apparatus 1000 is an AAnF.

For example, the processing module 1002 is configured to: receive, by using the transceiver module 1001, first identification information from a network exposure function network element, where the first identification information is used to determine an authentication server function network element corresponding to a terminal device; and obtain, from a unified data management network element based on the first identification information, identification information of the authentication server function network element corresponding to the terminal device.

Optionally, the first identification information includes an SUPI of the terminal device.

The processing module 1002 is specifically configured to: send, by using the transceiver module 1001, a second request message to the unified data management network element, where the second request message includes an SUPI of the terminal device, and the second request requests the unified data management network element to determine, based on the SUPI of the terminal device, the identification information of the authentication server function network element corresponding to the terminal device; and receive a second response message from the unified data management network element, where the second response message includes the identification information of the authentication server function network element corresponding to the terminal device.

Optionally, the second response message further includes subscription data of an AKMA service of the terminal device.

Optionally, the processing module 1002 is further configured to: receive, by using the transceiver module 1001, an identifier of an application function network element from a network exposure function network element; and obtain, from the authentication server function network element corresponding to the terminal device, a key that is of the AKMA service and that is identified by identification information of the key of the AKMA service.

The processing module 1002 is further configured to generate a communication key between the application function network element and the terminal device based on the identifier of the application function network element and the key of the AKMA service.

The processing module 1002 is further configured to send, by using the transceiver module 1001, the communication key to the application function network element by using the network exposure function network element.

Optionally, the processing module 1002 is further configured to: perform authorization detection on the terminal device or the application function network element, and when completing the authorization detection, determine the authentication server function network element identified by the identification information of the authentication server function network element corresponding to the terminal device.

Optionally, the authentication server function network element corresponding to the terminal device is an authentication server function network element corresponding to an intermediate key of the terminal device, and stores the intermediate key generated by the authentication server function network element in a primary authentication process.

The example is used to implement the function of the AAnF in the embodiment shown in FIG. 6A and FIG. 6B. When the apparatus 1000 is the AAnF, the apparatus 1000 is further configured to implement the function of the AAnF in the embodiments shown in FIG. 8A and FIG. 8B and FIG. 9. For details, refer to corresponding descriptions of the AAnF in FIG. 6A and FIG. 6B, FIG. 8A and FIG. 8B, and FIG. 9.

In a possible design, the apparatus 1000 is an NEF.

For example, the processing module 1002 is configured to: obtain, by using the transceiver module 1001, first identification information from the unified data management network element, where the first identification information is used to determine the authentication server function network element corresponding to the terminal device, and send the first identification information to an AKMA anchor function network element.

Optionally, the processing module 1002 is specifically configured to: receive, by using the transceiver module 1001, second identification information from the application function network element; send a first request message to the unified data management network element when determining that the application function network element authorizes the network exposure function network element to request a key, where the first request message includes the second identification information, and requests the unified data management network element to determine the first identification information based on the second identification information; and receive a first response message from the unified data management network element, where the first response message includes the first identification information.

Optionally, the second identification information includes identification information of a key of the AKMA service, and the first identification information includes an SUPI of the terminal device.

Optionally, the second identification information includes identification information of a key of the AKMA service and temporary identity information of the terminal device, and the first identification information includes an SUPI of the terminal device.

Optionally, the processing module 1002 is further configured to: receive, by using the transceiver module 1001, the identifier of the application function network element, and send the identifier of the application function network element to an AKMA anchor function network element.

Optionally, the authentication server function network element corresponding to the terminal device is an authentication server function network element corresponding to an intermediate key of the terminal device, and stores the intermediate key generated by the authentication server function network element in a primary authentication process.

The example is used to implement the function of the NEF in the embodiment shown in FIG. 6A and FIG. 6B. When the apparatus 1000 is the NEF, the apparatus 1000 is further configured to implement the function of the NEF in the embodiments shown in FIG. 8A and FIG. 8B and FIG. 9. For details, refer to corresponding descriptions of the NEF in FIG. 6A and FIG. 6B, FIG. 8A and FIG. 8B, and FIG. 9.

Figure 11:
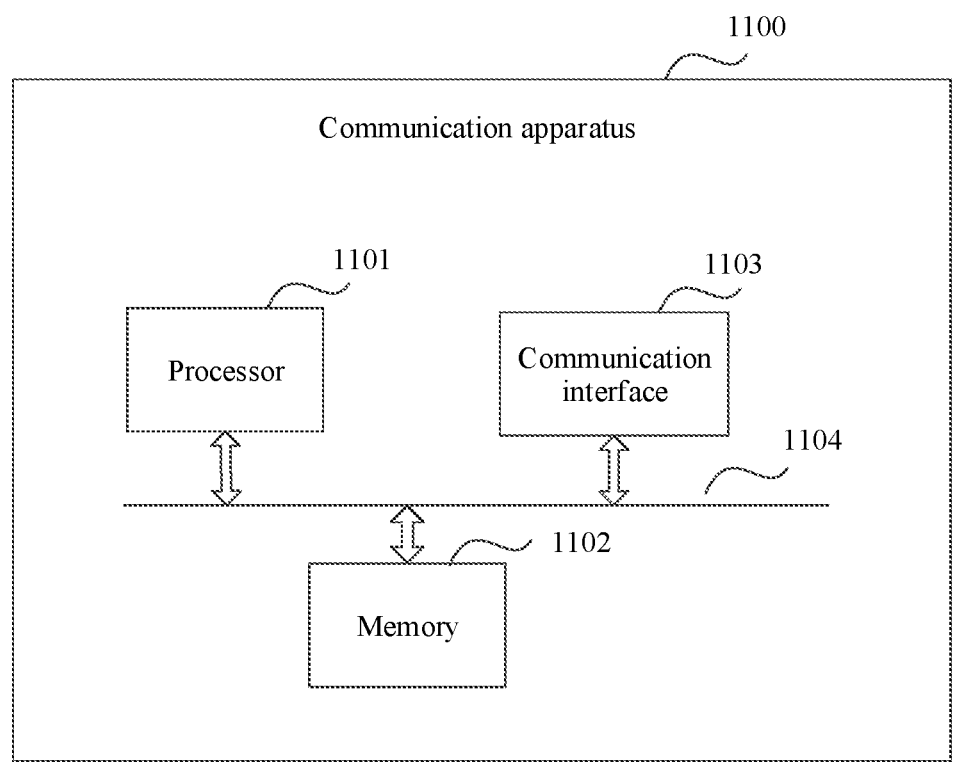
FIG. 11 is a schematic diagram of a structure of another communication apparatus according to this application.

FIG. 11 is a schematic diagram of a structure of another communication apparatus according to this application. A communication apparatus 1100 shown in FIG. 11 includes at least one processor 1101 and a memory 1102, and optionally, may further include a communication interface 1103.

The memory 1102 may be a volatile memory such as a random access memory. Alternatively, the memory may be a non-volatile memory such as a read-only memory, a flash memory, a hard disk drive (hard disk drive, HDD), or a solid-state drive (solid-state drive, SSD). Alternatively, the memory 1102 is any other medium that can be used to carry or store expected program code in an instruction form or a data structure form and that can be accessed by a computer, but is not limited thereto. The memory 1102 may be a combination of the foregoing memories.

In this embodiment of this application, a specific connection medium between the processor 1101 and the memory 1102 is not limited. In this embodiment of this application, the memory 1102 and the processor 1101 are connected through a bus 1104. The bus 1104 is represented by using a bold line in the figure, and a connection manner between other parts is merely used as an example for description, and does not limit this application. The bus 1104 may be divided into an address bus, a data bus, a control bus, and the like. For ease of representation, only one bold line is used to represent the bus in FIG. 11, but this does not mean that there is only one bus or only one type of bus.

The processor 1101 may have a data transceiver function, and can communicate with another device. In the apparatus shown in FIG. 11, an independent data transceiver module, for example, the communication interface 1103, may also be disposed and is configured to receive and send data. When communicating with the another device, the processor 1101 may transmit data through the communication interface 1103.

In an example, when an AAnF uses the form shown in FIG. 11, the processor in FIG. 11 may invoke computer-executable instructions stored in the memory 1102, so that the AAnF is enabled to perform the method performed by the AAnF in any one of the foregoing method embodiments.

In an example, when an NEF uses the form shown in FIG. 11, the processor in FIG. 11 may invoke the computer-executable instructions stored in the memory 1102, so that the NEF is enabled to perform the method performed by the NEF in any one of the foregoing method embodiments.

Specifically, functions/implementation processes of the processing module and the transceiver module in FIG. 10 may be implemented by the processor 1101 in FIG. 11 invoking the computer-executable instructions stored in the memory 1102. Alternatively, functions/implementation processes of the processing module in FIG. 10 may be implemented by the processor 1101 in FIG. 11 invoking the computer-executable instructions stored in the memory 1102, and functions/implementation processes of the transceiver module in FIG. 8A and FIG. 8B may be implemented through the communication interface 1103 in FIG. 11.

An embodiment of this application further provides a communication system. The system may include the AAnF and the NEF in FIG. 6A and FIG. 6B to FIG. 9, and optionally, may further include the UDM, the UE, the AF, and the AUSF in FIG. 6A and FIG. 6B to FIG. 9.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

A person skilled in the art may further understand that various illustrative logical blocks (illustrative logical blocks) and steps (steps) that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the functions for corresponding application, but it should not be considered that the implementation goes beyond the scope of embodiments of this application.

The solutions described in this application may be implemented in various manners. For example, the technologies may be implemented by hardware, software, or a combination thereof. For hardware implementation, a processing unit configured to execute these technologies at a communication apparatus (for example, a base station, a terminal, a network entity, a core network element, or a chip) may be implemented in one or more general-purpose processors, digital signal processors (digital signal processor, DSP), digital signal processor components, or application-specific integrated circuits (application-specific integrated circuit, ASIC), programmable logic devices, field programmable gate arrays (field programmable gate array, FPGA), or another programmable logic apparatus, discrete gate or transistor logic, discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

It may be understood that the memory in embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any memory of another appropriate type.

This application further provides a computer-readable medium storing a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by software, hardware, firmware, or any combination thereof. When software is used to implement embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a high-density digital video disc (digital video disc, DVD)), a semiconductor medium (for example, a solid-state drive (solid state disc, SSD)), or the like.

It may be understood that "an embodiment" mentioned in the entire specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments by using any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It may be understood that, in this application, "when" and "if" mean that an apparatus performs corresponding processing in an objective situation, but do not constitute a limitation on time, do not require that the apparatus have a determining action during implementation, and do not mean any other limitation.

"Simultaneously" in this application may be understood as being at a same time point, may be understood as being within a time period, or may be understood as being within a same periodicity.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural.

It may be understood that, in embodiments of this application, "B corresponding to A" indicates that B is associated with A, and B may be determined based on A. However, it should be further understood that determining B based on A does not mean that B is determined based only on A. B may alternatively be determined based on A and/or other information.

The correspondences shown in the tables in this application may be configured, or may be predefined. Values of the information in the tables are only examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person of ordinary skill in the art may understand that, for a purpose of convenient and brief descriptions, for a detailed working process of the foregoing system, apparatus, and unit, refer to a corresponding process in the foregoing method embodiments. Details are not described herein again.

It may be understood that the system, apparatus, and method described in this application may alternatively be implemented in another manner. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, function units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes a plurality of instructions for instructing a computer device (which may be a personal computer, a server, a network device, or the like) to perform all or some of the steps of the methods described in embodiments of this application. The foregoing storage medium includes various media that can store program code, such as a USB flash drive, a removable hard disk, a read-only memory (Read-Only Memory, ROM), a random access memory (Random Access Memory, RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method according to an internal logical relationship thereof. The foregoing descriptions are implementations of this application, but are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A communication system, wherein the communication system is configured to implement authentication and key management for applications (AKMA) service-based data transmission between a terminal device and an application function network element, and the communication system comprises:
    an AKMA anchor function network element; and
    a network exposure function network element, wherein:
    the network exposure function network element is configured to:
        receive second identification information from the application function network element;
        in response to determining that the application function network element authorizes the network exposure function network element to request a key, send a first request message to a unified data management network element, wherein the first request message, comprising the second identification information, requests the unified data management network element to determine first identification information based on the second identification information; and
        receive a first response message from the unified data management network element, wherein the first response message comprises the first identification information; wherein the first identification information is used to determine an authentication server function network element corresponding to the terminal device, and
        send the first identification information to the AKMA anchor function network element; and
    the AKMA anchor function network element is configured to:
        obtain, from the unified data management network element based on the first identification information, identification information of the authentication server function network element corresponding to the terminal device.

2. The communication system according to claim 1, wherein the second identification information comprises identification information of a key of the AKMA service, and the first identification information comprises a subscriber permanent identifier (SUPI) of the terminal device.

3. The communication system according to claim 1, wherein the second identification information comprises identification information of a key of the AKMA service and temporary identity information of the terminal device, and the first identification information comprises an SUPI of the terminal device.

4. The communication system according to claim 2, wherein when being configured to obtain, from the unified data management network element based on the first identification information, the identification information of the authentication server function network element corresponding to the terminal device, the AKMA anchor function network element is specifically configured to:
    send a second request message to the unified data management network element, wherein the second request message comprises the SUPI of the terminal device, and the second request message requests the unified data management network element to determine, based on the SUPI of the terminal device, the identification information of the authentication server function network element corresponding to the terminal device; and
    receive a second response message from the unified data management network element, wherein the second response message comprises the identification information of the authentication server function network element corresponding to the terminal device.

5. The communication system according to claim 1, wherein the authentication server function network element corresponding to the terminal device is an authentication server function network element corresponding to an intermediate key of the terminal device, and the authentication server function network element stores the intermediate key generated by the authentication server function network element in a primary authentication process.

6. A communication method, wherein the method is used to implement authentication and key management for applications (AKMA) service-based data transmission between a terminal device and an application function network element, and the communication method comprises:
    receiving, by an AKMA anchor function network element, first identification information from a network exposure function network element, wherein the first identification information comprises a subscriber permanent identifier (SUPI) of the terminal device; and
    sending, by the AKMA anchor function network element, a second request message to a unified data management network element, wherein the second request message comprises the SUPI of the terminal device; and
    receiving, by the AKMA anchor function network element, a second response message from the unified data management network element, wherein the second response message comprises identification information of an authentication server function network element corresponding to the terminal device.

7. The communication method according to claim 6, wherein the second response message further comprises subscription data of an AKMA service of the terminal device.

8. The communication method according to claim 6, wherein the method further comprises:
receiving, by the AKMA anchor function network element, an identifier of the application function network element from the network exposure function network element;
obtaining, by the AKMA anchor function network element from the authentication server function network element corresponding to the terminal device, a key that is of the AKMA service and that is identified by identification information of the key of the AKMA service;
generating, by the AKMA anchor function network element, a communication key between the application function network element and the terminal device based on the identifier of the application function network element and the key of the AKMA service; and
sending, by the AKMA anchor function network element, the communication key to the application function network element by using the network exposure function network element.

9. The communication method according to claim 8, wherein the method further comprises:
performing, by the AKMA anchor function network element, authorization detection on the terminal device or the application function network element, and
when completing the authorization detection, determining the authentication server function network element identified by the identification information of the authentication server function network element corresponding to the terminal device.

10. The communication method according to claim 6, wherein the authentication server function network element corresponding to the terminal device is an authentication server function network element corresponding to an intermediate key of the terminal device, and the authentication server function network element stores the intermediate key generated by the authentication server function network element in a primary authentication process.

11. A communication method, wherein the method is used to implement authentication and key management for applications (AKMA) service-based data transmission between a terminal device and an application function network element, and the communication method comprises:
receiving, by a network exposure function network element, second identification information from the application function network element;
when determining that the application function network element authorizes the network exposure function network element to request a key, sending, by the network exposure function network element, a first request message to a unified data management network element, wherein the first request message, comprising the second identification information, requests the unified data management network element to determine first identification information based on the second identification information;
receiving, by the network exposure function network element, a first response message from the unified data management network element, wherein the first response message comprises the first identification information; wherein the first identification information is used to determine an authentication server function network element corresponding to the terminal device; and
sending, by the network exposure function network element, the first identification information to an AKMA anchor function network element.

12. The communication method according to claim 11, wherein the second identification information comprises identification information of a key of the AKMA service, and the first identification information comprises a subscriber permanent identifier (SUPI) of the terminal device.

13. The communication method according to claim 11, wherein the second identification information comprises identification information of a key of the AKMA service and temporary identity information of the terminal device, and the first identification information comprises an SUPI of the terminal device.

14. The communication method according to claim 11, wherein the communication method further comprises:
receiving, by the network exposure function network element, an identifier of the application function network element; and
sending the identifier of the application function network element to the AKMA anchor function network element.

15. The communication method according to claim 11, wherein the authentication server function network element corresponding to the terminal device is an authentication server function network element corresponding to an intermediate key of the terminal device, and the authentication server function network element stores the intermediate key generated by the authentication server function network element in a primary authentication process.

16. The communication method according to claim 11, wherein the method further comprises:
receiving, by the AKMA anchor function network element, the first identification information from the network exposure function network element;
sending, by the AKMA anchor function network element, a second request message to the unified data management network element, wherein the second request message comprises an SUPI of the terminal device; and
receiving, by the AKMA anchor function network element, a second response message from the unified data management network element, wherein the second response message comprises identification information of the authentication server function network element corresponding to the terminal device.

17. The communication method according to claim 16, wherein the second response message further comprises subscription data of an AKMA service of the terminal device.

18. The communication method according to claim 16, wherein the method further comprises:
receiving, by the AKMA anchor function network element, an identifier of the application function network element from the network exposure function network element;
obtaining, by the AKMA anchor function network element from the authentication server function network element corresponding to the terminal device, a key that is of the AKMA service and that is identified by identification information of the key of the AKMA service;
generating, by the AKMA anchor function network element, a communication key between the application function network element and the terminal device based on the identifier of the application function network element and the key of the AKMA service; and sending, by the AKMA anchor function network element, the communication key to the application function network element by using the network exposure function network element.

19. The communication method according to claim 18, wherein the communication method further comprises:

performing, by the AKMA anchor function network element, authorization detection on the terminal device or the application function network element, and when completing the authorization detection, determining the authentication server function network element identified by the identification information of the authentication server function network element corresponding to the terminal device.

20. The communication method according to claim 16, wherein the authentication server function network element corresponding to the terminal device is an authentication server function network element corresponding to an intermediate key of the terminal device, and the authentication server function network element stores the intermediate key generated by the authentication server function network element in a primary authentication process.

* * * * *